(12) United States Patent
Villain

(10) Patent No.: US 9,024,218 B2
(45) Date of Patent: May 5, 2015

(54) CONTROL DEVICE COMPRISING A MOVABLE UPPER PANEL FOR ACTUATING A SWITCHING BREAKER

(71) Applicant: CoActive Technologies, LLC, Newton, MA (US)

(72) Inventor: Jean-Christophe Villain, Dole (FR)

(73) Assignee: CoActive Technologies, LLC, Newton, MA (US)

( * ) Notice: Subject to any disclaimer, the term of this patent is extended or adjusted under 35 U.S.C. 154(b) by 137 days.

(21) Appl. No.: 13/857,498

(22) Filed: Apr. 5, 2013

(65) Prior Publication Data

US 2013/0264181 A1  Oct. 10, 2013

(30) Foreign Application Priority Data

Apr. 5, 2012 (FR) ...................................... 12 53129

(51) Int. Cl.
*H01H 13/70* (2006.01)
*H01H 3/12* (2006.01)
*G06F 3/0354* (2013.01)
*G06F 3/041* (2006.01)

(52) U.S. Cl.
CPC ........... *H01H 3/122* (2013.01); *G06F 3/03547* (2013.01); *G06F 3/0414* (2013.01)

(58) Field of Classification Search
CPC ......... H01H 3/125; H01H 3/16; H01H 13/14; H06F 1/16; B41J 5/08
USPC .................. 200/293, 345, 318, 329, 341, 344
See application file for complete search history.

(56) References Cited

U.S. PATENT DOCUMENTS

| | | | | |
|---|---|---|---|---|
| 3,519,116 A * | 7/1970 | Koehn | ........................ | 400/477 |
| 5,779,030 A * | 7/1998 | Ikegami et al. | ............... | 200/344 |
| 6,100,482 A | 8/2000 | Koma et al. | | |
| 6,704,005 B2 | 3/2004 | Kato et al. | | |
| 1,022,660 A1 | 9/2011 | Lo et al. | | |

FOREIGN PATENT DOCUMENTS

| | | |
|---|---|---|
| FR | 2947645 A1 | 1/2011 |
| GB | 2077195 A | 12/1981 |
| JP | 11039986 A | 2/1999 |

* cited by examiner

*Primary Examiner* — Edwin A. Leon
*Assistant Examiner* — Anthony R. Jimenez
(74) *Attorney, Agent, or Firm* — Fox Rothschild LLP

(57) ABSTRACT

A device for the control of an electronic apparatus. The device includes an upper panel upon which a user may exert at least one control action, a lower support armature upon which the upper panel is vertically and movably mounted, a switching breaker configured to be triggered by the upper panel, and an articulated structure configured to hold the upper panel. An axis of actuation of the switching breaker may be arranged at the periphery of a contour of the upper panel, and the articulated structure may include several consecutive shafts, each of which is arranged along an associated edge of the contour of the upper actuation face of the upper panel.

8 Claims, 27 Drawing Sheets

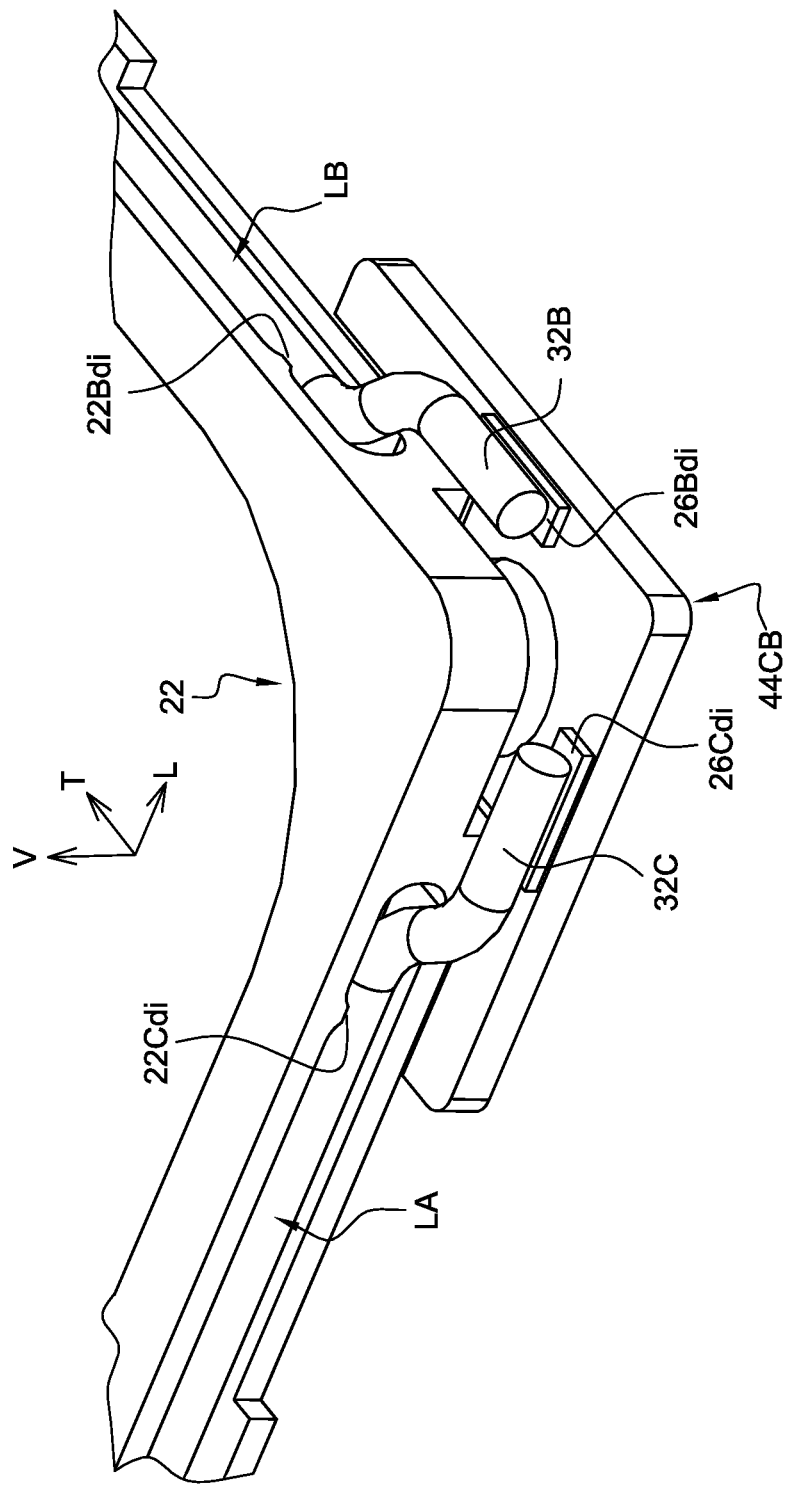

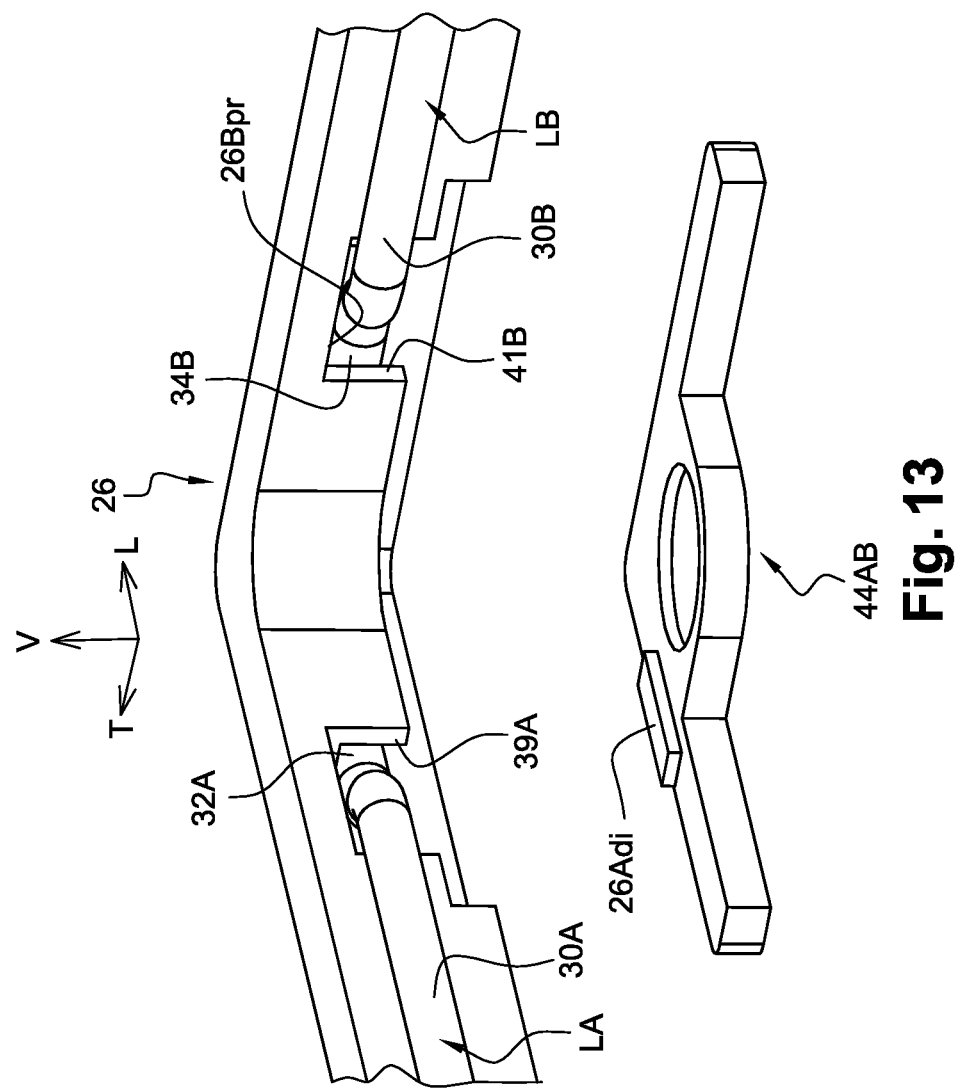

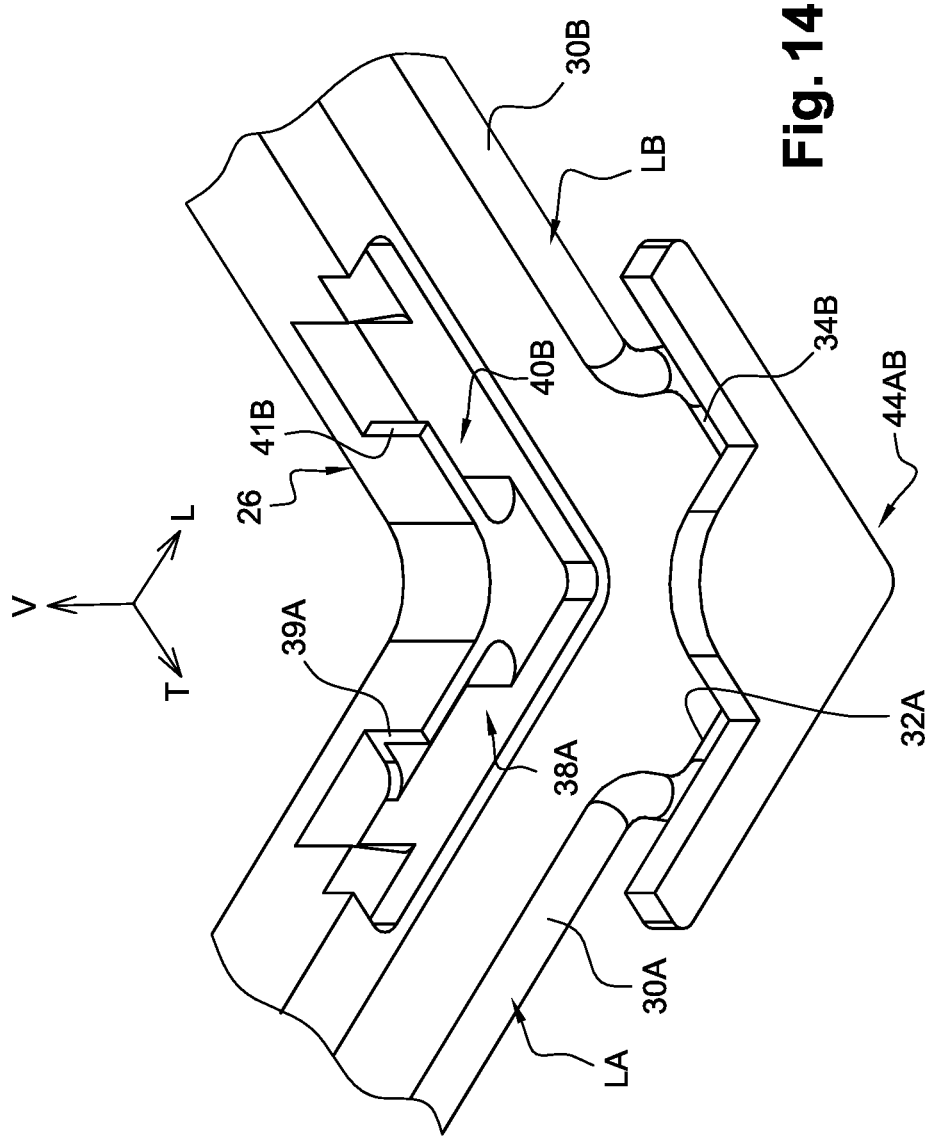

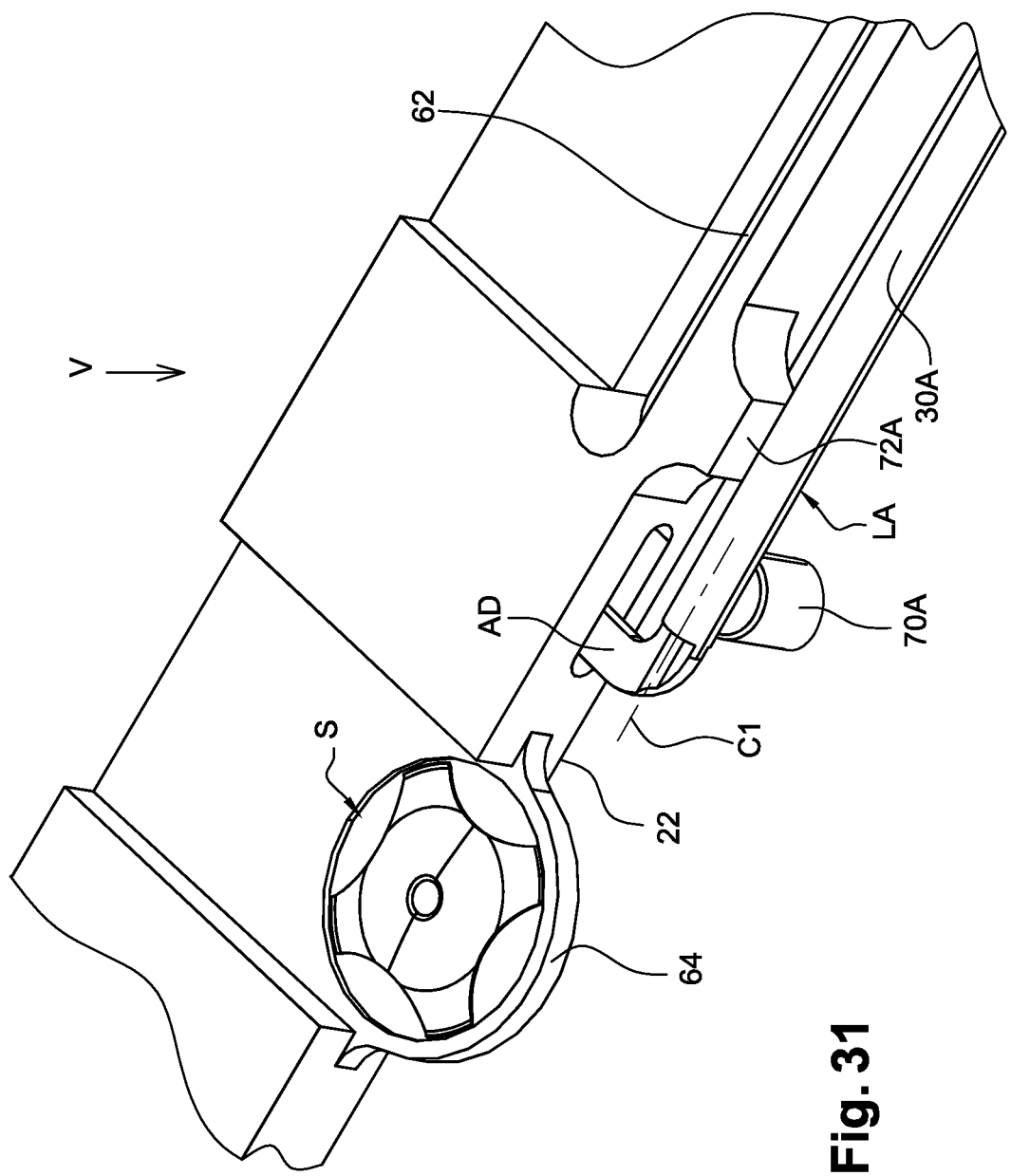

CONTROL DEVICE COMPRISING A MOVABLE UPPER PANEL FOR ACTUATING A SWITCHING BREAKER

CROSS REFERENCE TO RELATED APPLICATION

This application claims the priority benefit of France Patent Application No. 1253129 filed Apr. 5, 2012, the content of which is hereby incorporated by reference in its entirety

BACKGROUND

The present disclosure relates to a device for the control of an electronic apparatus, the device including a movable upper panel on which at least one control action is exerted.

More specifically, the present disclosure relates particularly to a device for the control of an electronic apparatus, the device includes an upper panel which extends in a globally horizontal plane, comprising an upper, so-called actuation, face on which, by means of a control member, a user can exert at least one control action by applying to this upper face a globally downward oriented pressure loading; a lower support armature with respect to which the upper panel, under the effect of the control action, that is movably mounted according to a vertical motion between a top rest position, to which the panel is elastically restored, and an active bottom position; a switching breaker which is triggered directly by the upper panel to produce a control signal for the electronic apparatus when the upper panel is in its active bottom position; and an articulated structure which is interposed vertically between the upper panel and the armature to hold the upper panel globally parallel to itself in a horizontal plane during its downward vertical motion with respect to the armature.

Such a control device is made in such a way that, under the effect of the control action, the upper panel is able to move downwards, according to a motion consisting globally of a vertical translation, so as to act on the switching breaker with a view to causing its triggering, that is to say with a view to causing a change of switching state by for example toggling the electrical breaker from a rest state in which it is normally open, to a closed active state. The articulated structure cooperates with the upper panel and with the lower armature to suspend and hold the upper panel substantially parallel to its horizontal plane when a control action able to cause its vertical displacement is exerted.

U.S. Pat. No. 6,704,005, the content of which is hereby incorporated by reference in its entirety, describes and represents such a control device in which the breaker or switch is of the mono-stable type with abrupt change of state providing a tactile sensation of change of state and which is arranged in such a way that its actuation axis is arranged globally at the centre of the upper actuation face which is delimited by a rectangular contour. Moreover, the structure for suspending and holding the upper panel is illustrated in a schematic manner in the form of a pantograph in two parts with crossed arms which constitutes an "up and down" mechanism designed in such a way that the upper panel is supported by the pantograph so as to be able to move upwards and downwards.

Such a device exhibits a global imbalance of the upper panel "about" the vertical axis of the switch which causes unchecked tilting motions of the upper panel, in particular as a function of the position, in the upper actuation face, of the point at which the control action is applied. Indeed, this design causes an imbalance of the system depending on whether the control action is exerted on the upper panel at a point positioned in proximity to the position of the switching breaker, or at a point distant from the latter. These imbalances, associated with the interactions of the pantograph with the upper panel, induce in particular a non-regularity of the manipulation sensations for the user. Moreover, the resulting force of the control action is not transmitted in a homogeneous manner to the switching breaker.

SUMMARY

One aim of the present disclosure is in particular to propose a device for the control of an electronic apparatus making it possible to hold the upper panel parallel to its horizontal plane whatever the position of the point of application of the control action.

With this aim, the present disclosure proposes a device for the control of an electronic apparatus of the type mentioned above, wherein the vertical axis of actuation of the switching breaker, which is carried by the lower armature or by the upper panel, is arranged at the periphery of the contour of the upper panel; and the articulated structure comprises several consecutive shafts, for transmission of loadings and of motions towards the breaker. Each shaft may extend in a rectilinear direction and is arranged along an associated edge of the contour of the upper actuation face; comprise a first distal (with respect to the switching breaker) end segment which bears vertically downwards against a distal contact point belonging to the lower armature, and which bears vertically upwards against a distal contact point belonging to the upper panel; and comprise a second proximal (with respect to the switching breaker) end segment which bears vertically upwards against a proximal contact point belonging to the lower armature, and which bears vertically downwards against a proximal contact point belonging to the upper panel. Additionally, for each shaft, its two points of contact, distal and proximal, with the upper panel may be arranged longitudinally according to a first longitudinal geometric axis, and its two points of contact, distal and proximal, with the lower armature may be arranged longitudinally according to a second geometric axis which is parallel to the first geometric axis.

According to other characteristics of the invention, taken in isolation or in combination, the vertical axis of actuation of the switching breaker may be arranged between the two proximal end segments of two consecutive shafts; the switching breaker may be interposed vertically between the upper panel and the lower armature, the switching breaker configured to produce a control signal when it is subjected to a pressure loading greater than a predetermined threshold value, and when the value of the pressure loading is less than the said threshold value, the switching breaker constitutes an abutment of the upper panel in its upper rest position to which it is restored elastically by the switching breaker; by virtue of which, the switching breaker makes it possible to detect any control action consisting in exerting on the upper face of the upper panel a pressure greater than a so-called predetermined threshold value.

Additionally, according to other characteristics of the invention, each shaft may be rotatably mounted with respect to the upper panel about a geometric axis globally parallel to the rectilinear direction along which it extends between its two end segments, distal and proximal; and may be rotatably mounted with respect to the lower armature, about an axis globally parallel to the rectilinear direction along which it extends between its two distal end segments, by virtue of which the relative motions of the upper panel with respect to the lower armature transmitted to the distal end segment are transmitted and applied to the proximal end segment in the form of a couple.

Additionally, according to other characteristics of the invention, each shaft may comprises a rectilinear central part, a rectilinear distal end part parallel to the central part and offset laterally with respect to the central part, and a proximal end part which is aligned longitudinally with the proximal end part, the said two contact points belonging to the upper panel cooperate with opposite zones of the said central part, and each contact point belonging to the lower armature cooperates with an opposite zone of the associated end part. The upper actuation face may be delimited by a polygonal contour, in particular a rectangle, and at least two consecutive shafts are arranged along at least two consecutive sides of the polygonal contour, respectively.

Additionally, according to other characteristics of the invention, the device may exhibit a general symmetry of design with respect to a vertical plane of symmetry passing through the vertical axis of actuation of the switching breaker. Each shaft may be associated with at least one adjusting member which is associated in an adjustable manner, in the vertical direction, with the lower armature in order to take up all of the assembly plays and apply a preload to the associated shaft.

BRIEF DESCRIPTION OF THE DRAWINGS

Other characteristics and advantages of the invention will become apparent on reading the detailed description which follows for the understanding of which reference will be made to the appended figures among which:

FIGS. 9 to 12 depict large-scale detail views illustrating, successively in the four corner angles, components of the device such as they are arranged in FIG. 4.

FIGS. 13 and 14 depict perspective views, according to two different angles of view, illustrating certain of the components of the device in a corner angle of the device.

FIGS. 29 to 31 depict larger-scale perspective views illustrating the cooperation of the shafts with the lower armature and/or the upper panel.

Figure 1:
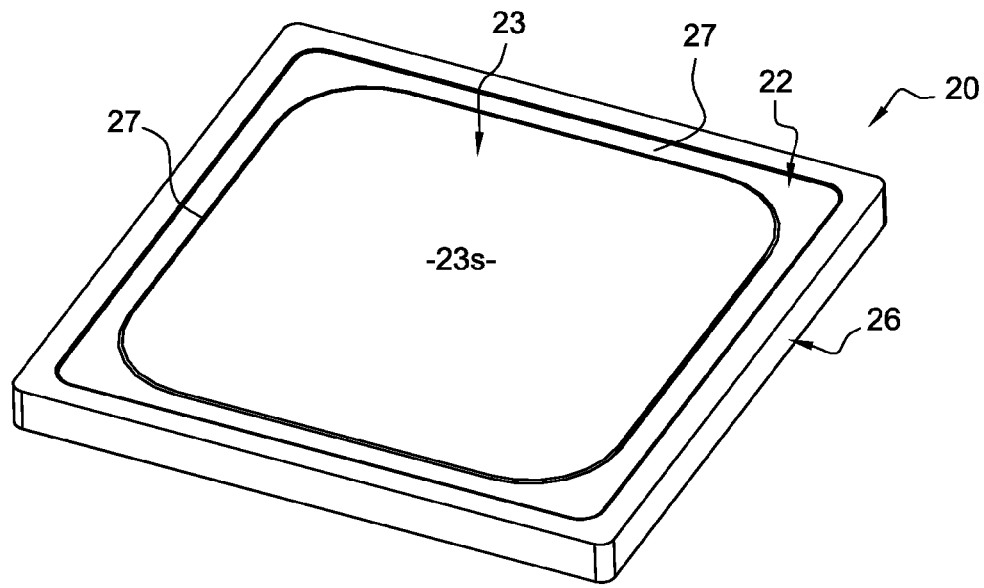
FIG. 1 depicts a schematic perspective representation of a first exemplary embodiment of a control device according to the invention.

For the description of the invention, the vertical, longitudinal and transverse orientations according to the coordinate system V, L, T indicated in the figures will be non-limitingly adopted, and without limiting reference to terrestrial gravity, the horizontal plane corresponding to the plane of the axes L and T.

In the description which follows, identical, similar or analogous elements will be designated by the same numeric or alphanumeric references.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Represented in the figures is a device 20 for the control of an electronic apparatus such as for example a computer, a portable digital apparatus, often called by its English initials PDA for "Personal Digital Assistant", or else a "Smartphone", combining the characteristics of a PDA and those of a digital telephone, or else a remote control for remotely controlling various electronic apparatuses such as for example audiovisual apparatuses, air-conditioning apparatuses, etc.

The control device may comprise an upper panel 21 on which a user acts for the control of the electronic apparatus. The upper panel 21 may comprise a plane element which is of horizontal orientation and of square or rectangular shape, whose sides are parallel to the longitudinal L and transverse T directions. The upper panel 21 may be constructed here, by way of nonlimiting example, of two pieces comprising a peripheral frame 22 and an "active" central block 23 which, in the assembled position of these two components, form an integral whole 21.

The actuation of the control device 20 may result from exerting an action, that will subsequently be called a "control action", on the upper face 23s of the central block 23 of the upper panel 21 by way of a pointing element which is for example a stylus, or else the end of a finger of a user (not represented). The control action may include a pressure loading oriented mainly in the downward vertical direction V, which is exerted by the pointing element at a point of contact between an end of the pointing element and the upper face 23s.

According to one embodiment, the central block 23 may solely include a plate, of, for example, rigid plastic, so as to constitute a simple control "button". According to another embodiment, the central block 23 is "active" and may comprise means for locating the position of the contact point on the upper face 23s. The control device 20 is then of the type called a "Touch Pad", used for example for a laptop computer.

According to another embodiment, in addition to the means for locating the contact point, the block 23 of the upper panel 21 may comprise information display means, for example a display screen, to allow the user to see information relating to the electronic apparatus, and/or information associated with the manipulations that the user performs on the upper panel 21. The upper panel 21 is then a component commonly called a "Touchscreen".

The control device 20 may be, for example, intended to be mounted in an electronic apparatus in such a way that the upper face 23s of the block 23 of the upper panel 21 is flush with a casing or cladding element of the electronic apparatus.

The frame 22 of the upper panel 21 may be a peripheral frame which surrounds the central block 23, and which is of square general shape and is, for example, a piece molded from plastic whose structure will be described subsequently in detail in the following discussions.

The control device 20 may also comprise a lower armature 26, by way of which the control device 20 is assembled and fixed inside the electronic apparatus. The lower armature 26 is represented in the figures in the form of a square frame which, in the assembled position of the main components of the control device 20, may surround the peripheral frame 22 of the upper panel 21 in such a way that, as may be seen in particular in FIG. 1, the three components 22, 23 and 26 may extend in the same horizontal plane so as to form a control device 20 of generally plane shape and of reduced height corresponding for example to the vertical thickness of the armature 26.

The armature 26 may be, for example, fixed on a printed circuit board "PCB" of the electronic apparatus and the whole of the central part inside the armature 26 situated under the upper panel 21 is cleared for the arranging of electronic or electrical components and corresponding circuits on the upper face of the printed circuit board.

Like the frame 22 of the upper panel 21, the lower armature 26 may be, for example, molded from plastic. The detailed design of the lower armature 26 will be described subsequently in greater detail in the following discussions.

The control device 20 may further comprise an articulated structure which is interposed, globally vertically, between the frame 22 of the upper panel 21 and the lower armature 26 to hold the upper panel 21 parallel to the horizontal plane, that is to say parallel to itself, during the vertical motions of the upper panel 21 with respect to the armature 26, and in particular during any downward vertical motion of the upper panel 21. The articulated structure here may be composed of four consecutive peripheral shafts for transmitting loadings and motions LA, LB, LC and LD. Each shaft may extend in a globally rectilinear direction and it is arranged along an associated edge of the contour 27 of the upper face 23s for actuating the control device 20.

To facilitate description and understanding, each "side" of the control device 20 may thus be associated with a letter with index A, B, C, or D, and each of the angles or corners of the device is associated with a pair of letters with index A and B, B and C, C and D or D and A respectively. As will be explained subsequently, the control device may comprise, arranged at its corner AD, a switching breaker S and each shaft may thus comprise, by definition, a proximal longitudinal end situated closest to the switching breaker S, and a distal longitudinal end situated furthest from the switching breaker S. Thus, identical, analogous, or similar components or arrangements may be designated by the same numeric or alphanumeric references indexed A, B, C, or D as a function of the side of the control device and/or of the corresponding shaft.

The switching breaker S may be configured to be actuated when the upper panel 21 moves downwards under the effect of the control action, then producing a control signal intended for the electronic apparatus. The switching breaker S may be of any known type.

The pressure loading which is exerted on the upper panel 21 may be transmitted to the switching breaker S such that the latter is actuated, under the effect of the control action applied to the upper panel 21. According to one embodiment, the switching breaker S may be configured to produce the control signal when it is subjected to a pressure loading of greater than a predetermined value. Thus, the switching breaker S may make it possible to detect any control action including exerting, on the upper face 23s of the upper panel 21, a pressure greater than a predetermined value termed the threshold value.

According to another embodiment, when the value of the control action is less than the said threshold value, the switching breaker S may constitute an abutment for the upper panel 21 at a certain vertical position, or altitude, with respect to the lower armature 26, blocking the downward displacement of the upper panel 21 with respect to the lower armature 26. In this "top" rest position, the switching breaker S may not be actuated and the control signal may not be produced. When, as is illustrated schematically in the figures, the switching breaker S consists essentially of a "dome" of known general design which is able to change state when the value of the control action becomes greater than the said threshold value, it is this dome which may constitute the abutment mentioned hereinabove.

During the change of state of the breaker S, the latter may then no longer form an abutment for the upper panel 21 (which is retracted), thus allowing the upper panel 21 to then move vertically downwards to a bottom position of so-called actuation, or triggering, of the switching breaker S. The control signal may then be produced when the switching breaker S changes state, that is to say when, in a known manner, the conducting lower face of the dome establishes a switching path with associated electrical tracks (not represented) arranged opposite, here in the lower armature 26.

On account of the abrupt change of state of the dome of the switching breaker S, a tactile sensation may also be perceived by the user, by way of the pointing element, or of his finger, since the user feels in particular a fast modification of the resistance to the displacement of the upper panel 21, in the manner of a "click" of a push-button. The user may thus be informed tactilely that the control action has been exerted on the control device 20 and has caused the production of a control signal by way of the switching breaker S.

Figure 7:
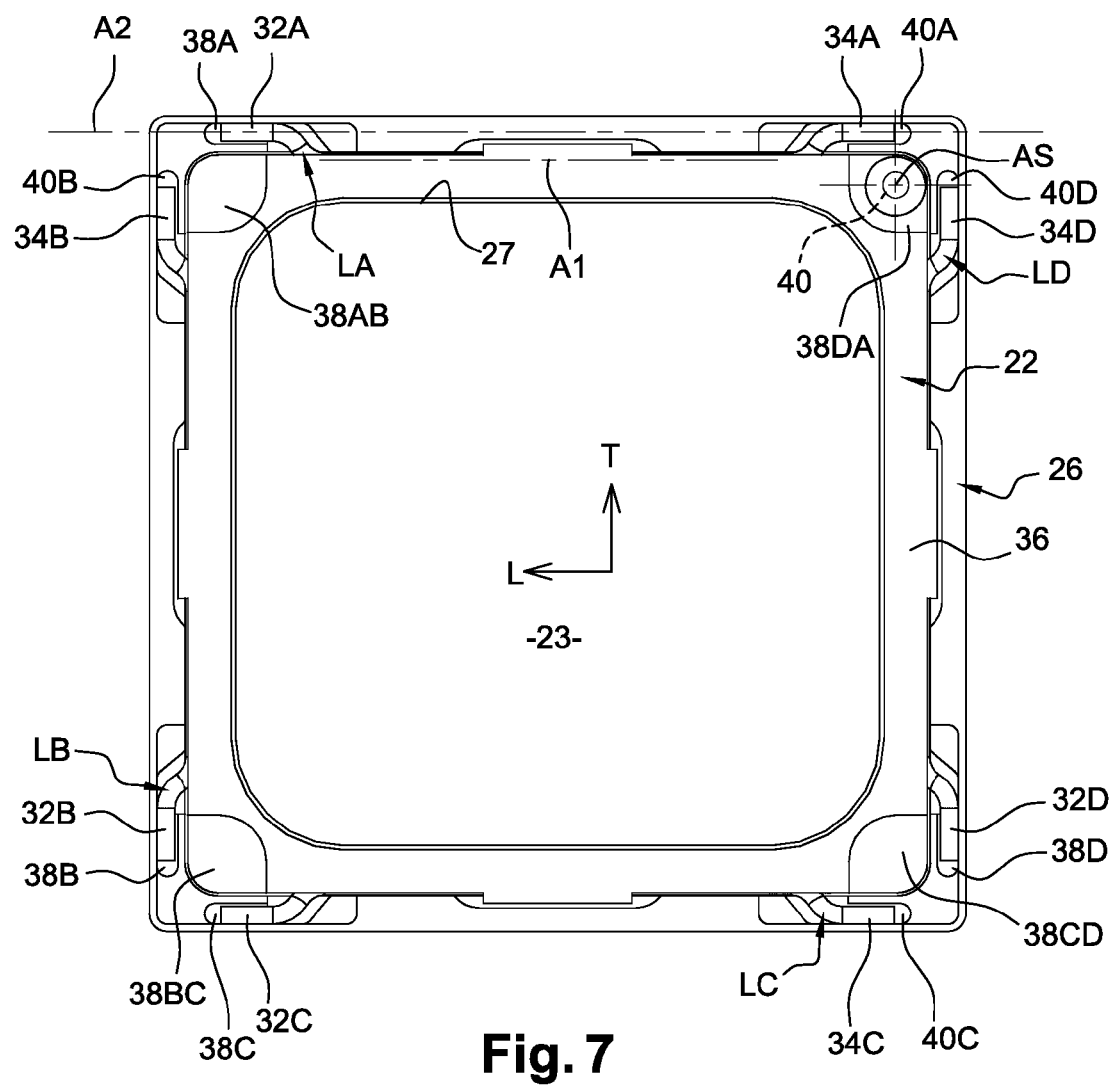
FIG. 7 depicts a view analogous to that of FIG. 6 illustrating certain of the components of the device.
Figure 8:
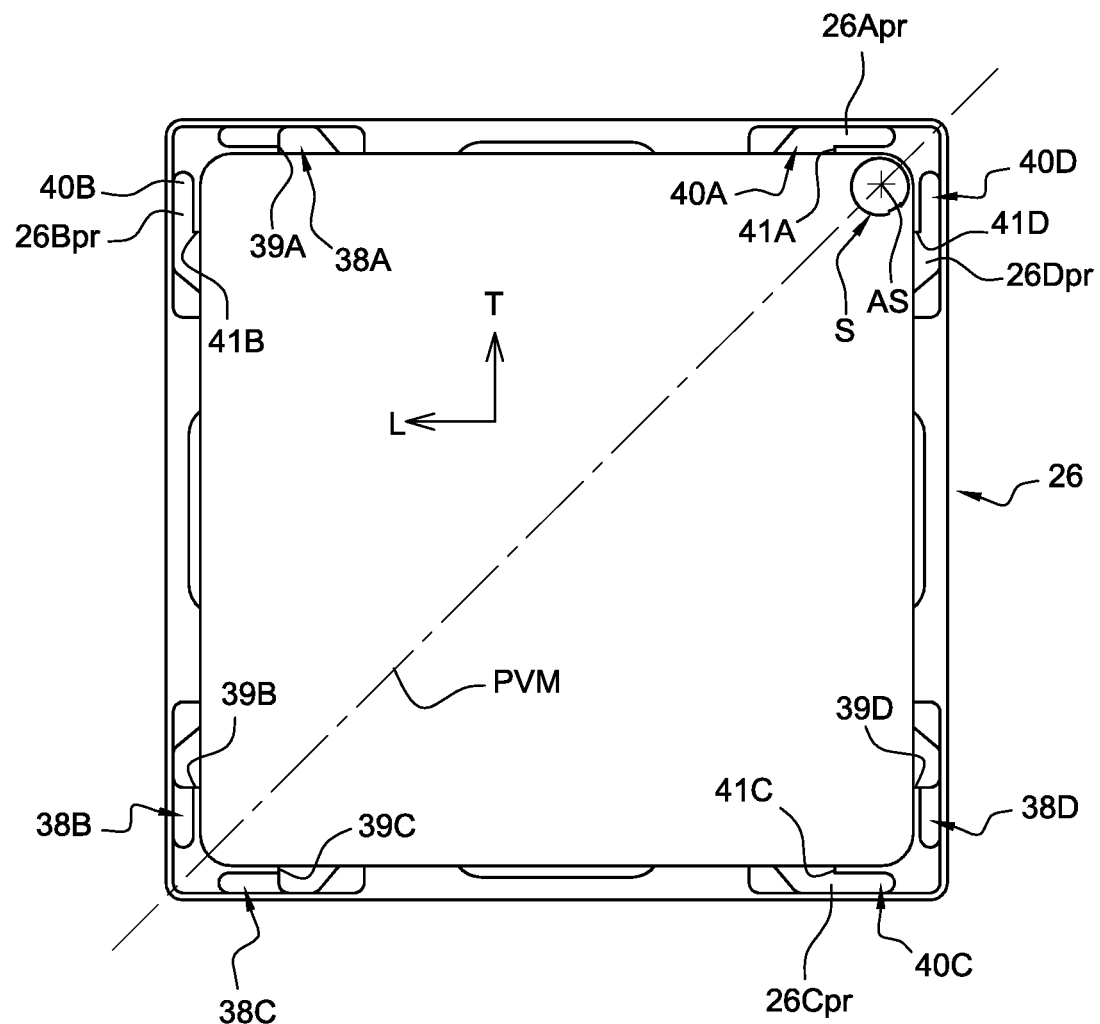
FIG. 8 depicts a view analogous to that of FIG. 7 further illustrating certain components of the device.
Figure 9:
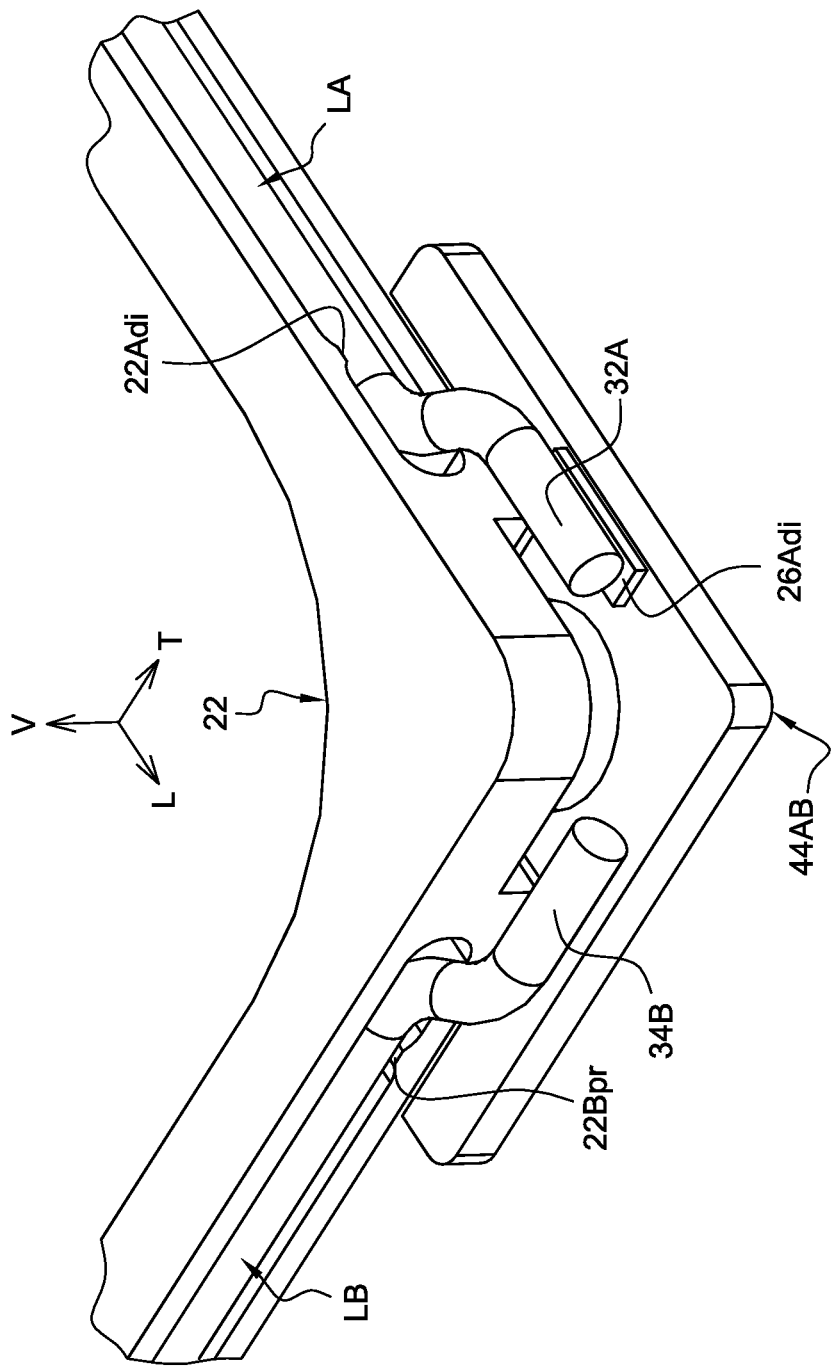
Figure 10:
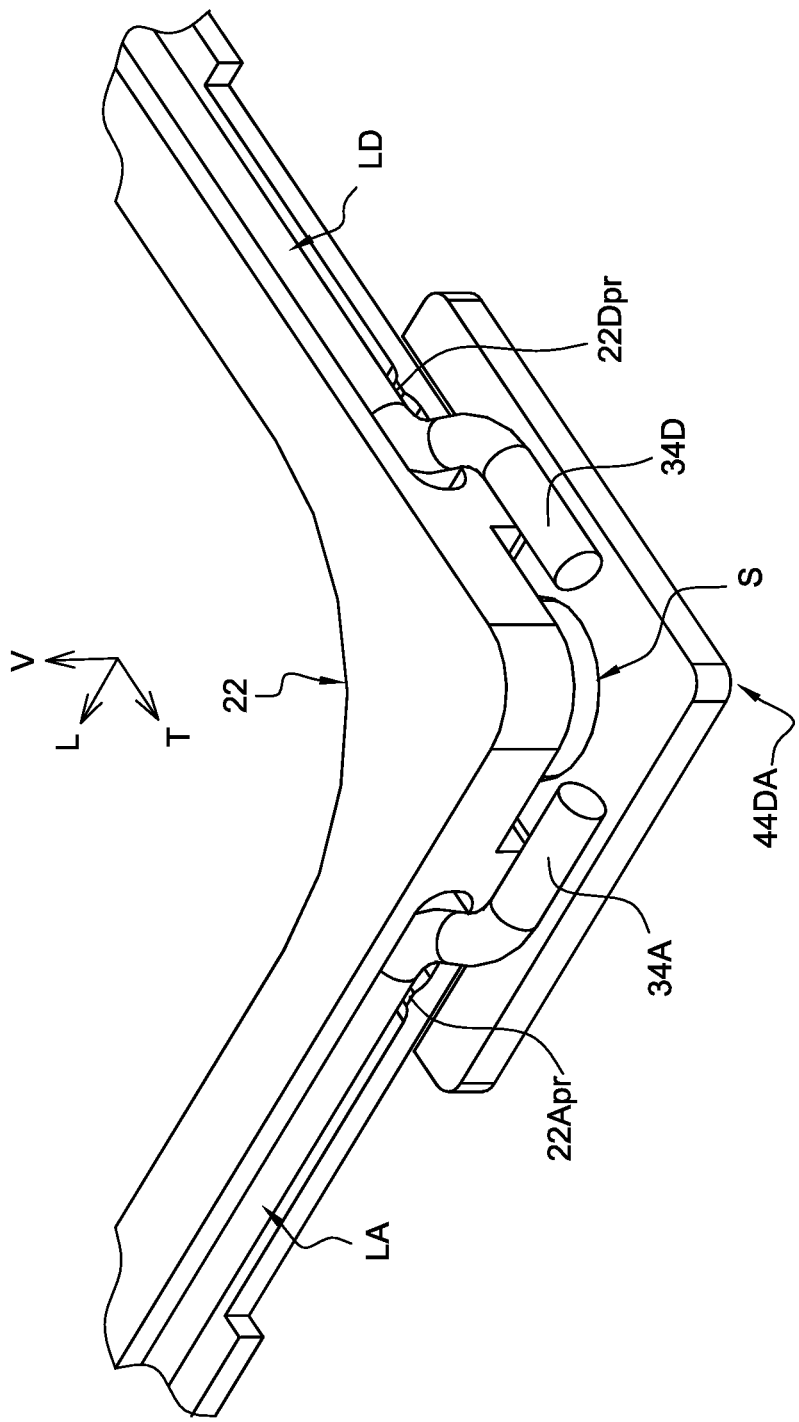
Figure 11:
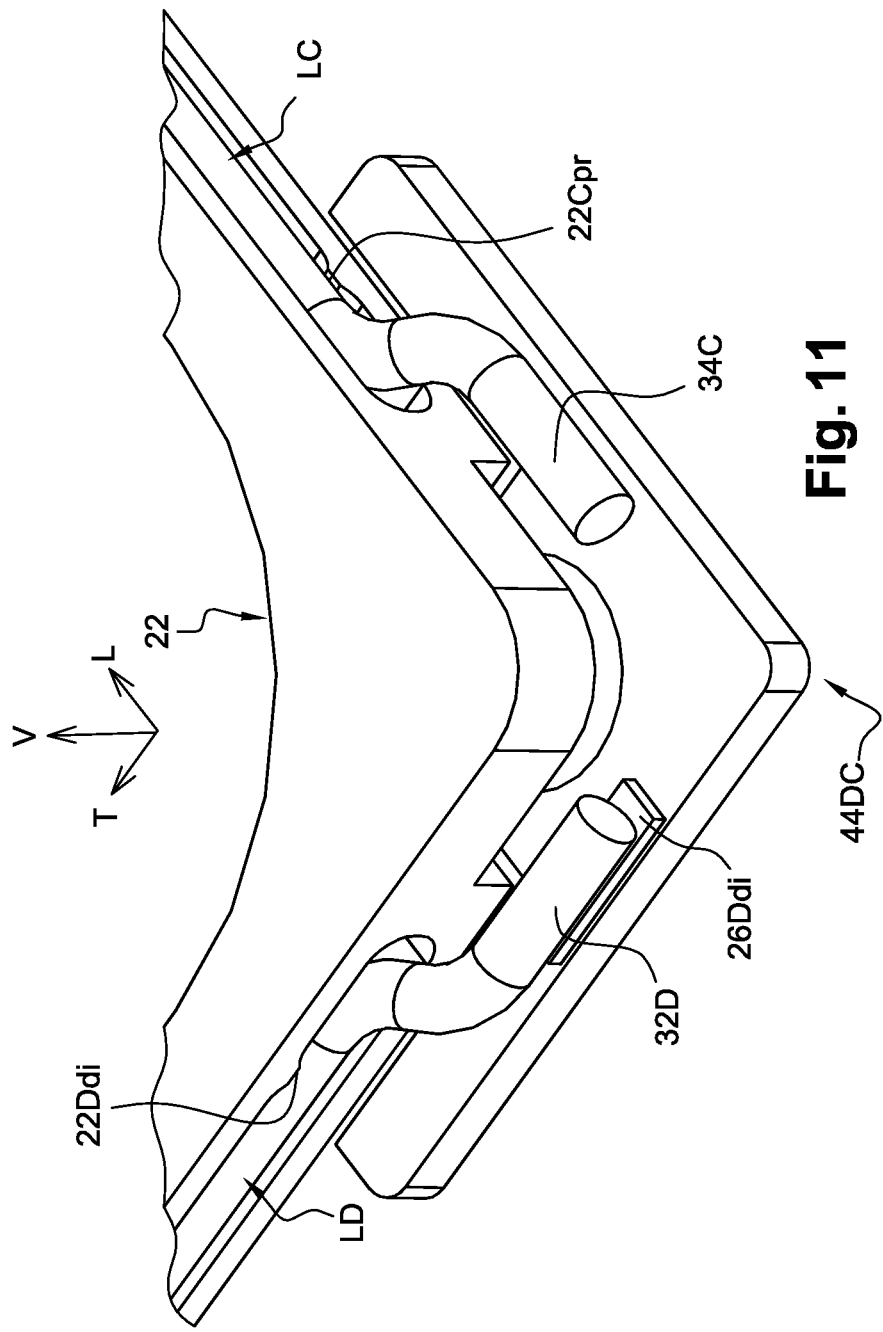

As may be seen in the figures, and in particular in FIG. 7, the switching breaker S may be arranged geometrically in such a way that its vertical axis of actuation AS is arranged at the periphery of the contour 27 of the upper panel 23s.

Figure 15:
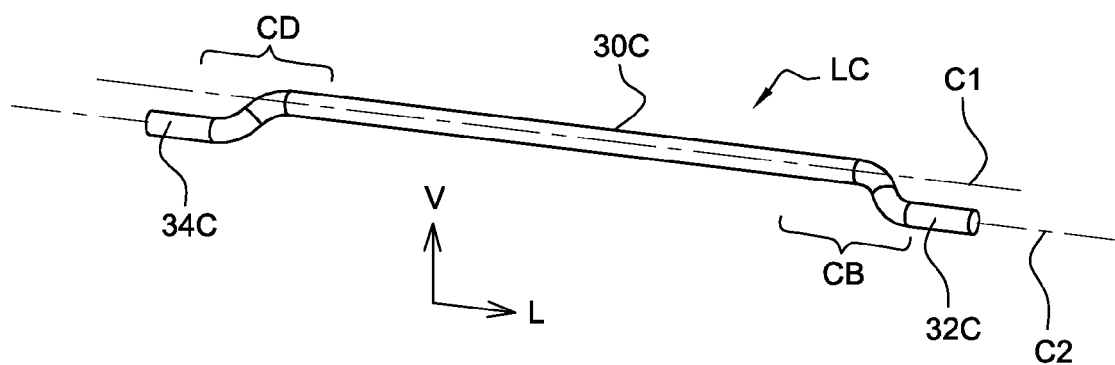
FIG. 15 depicts a large-scale view of one of the shafts of the device represented in FIG. 1.
Figure 2:
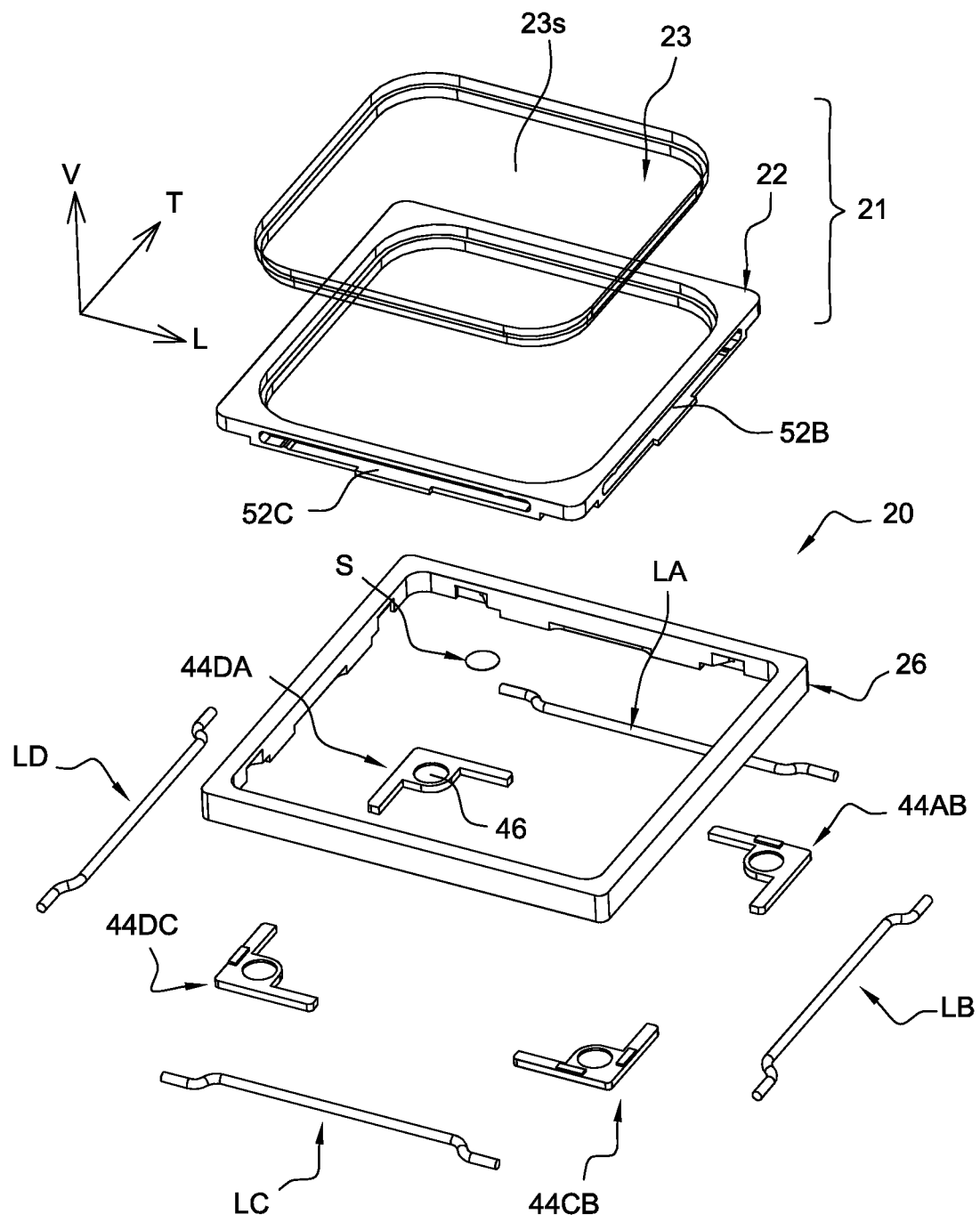
FIG. 2 depicts an exploded perspective view of the control device represented in FIG. 1.
Figure 3:
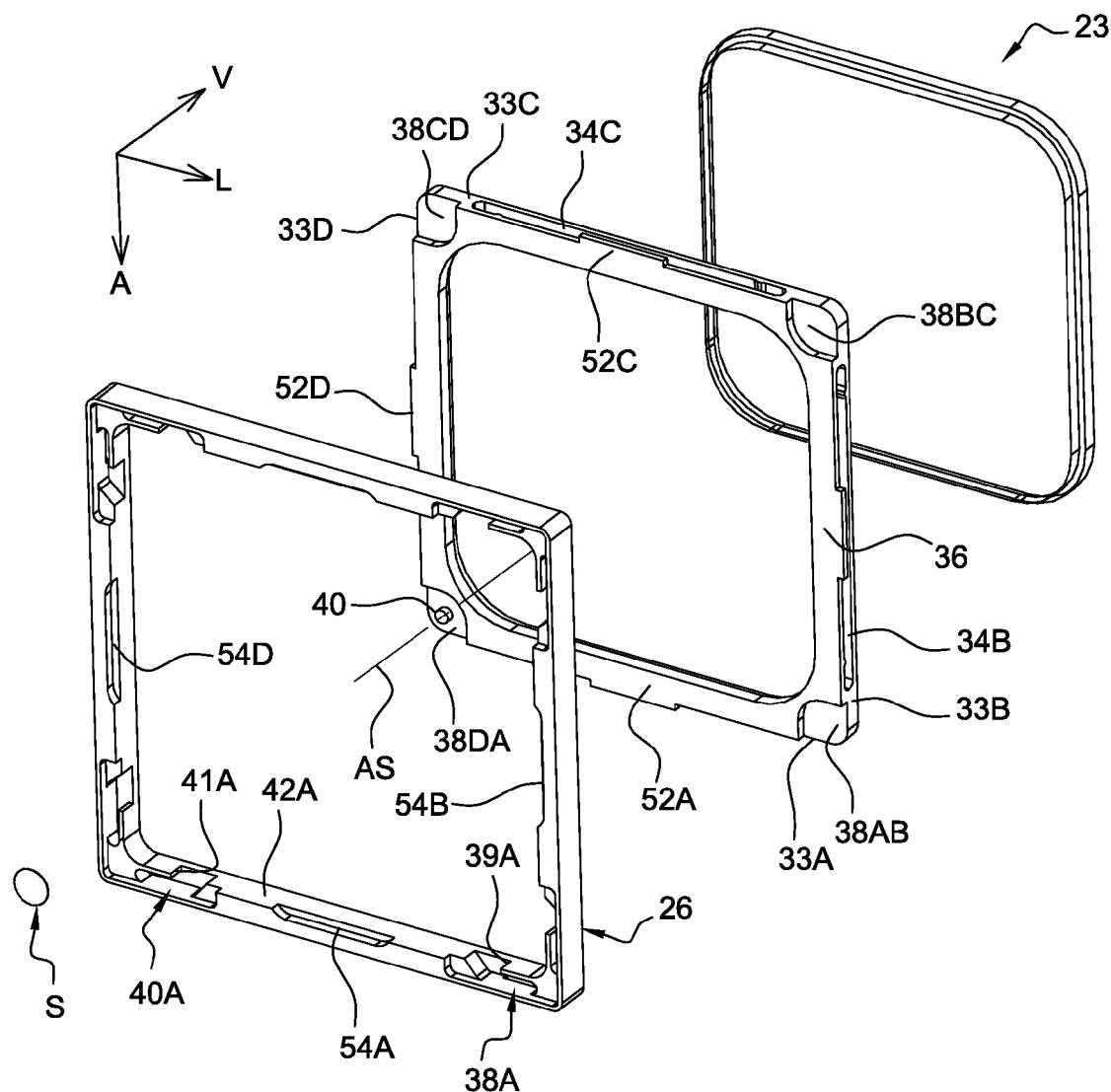
FIG. 3 depicts a perspective view, according to another angle of view, of certain of the components represented in FIG. 2.
Figure 4:
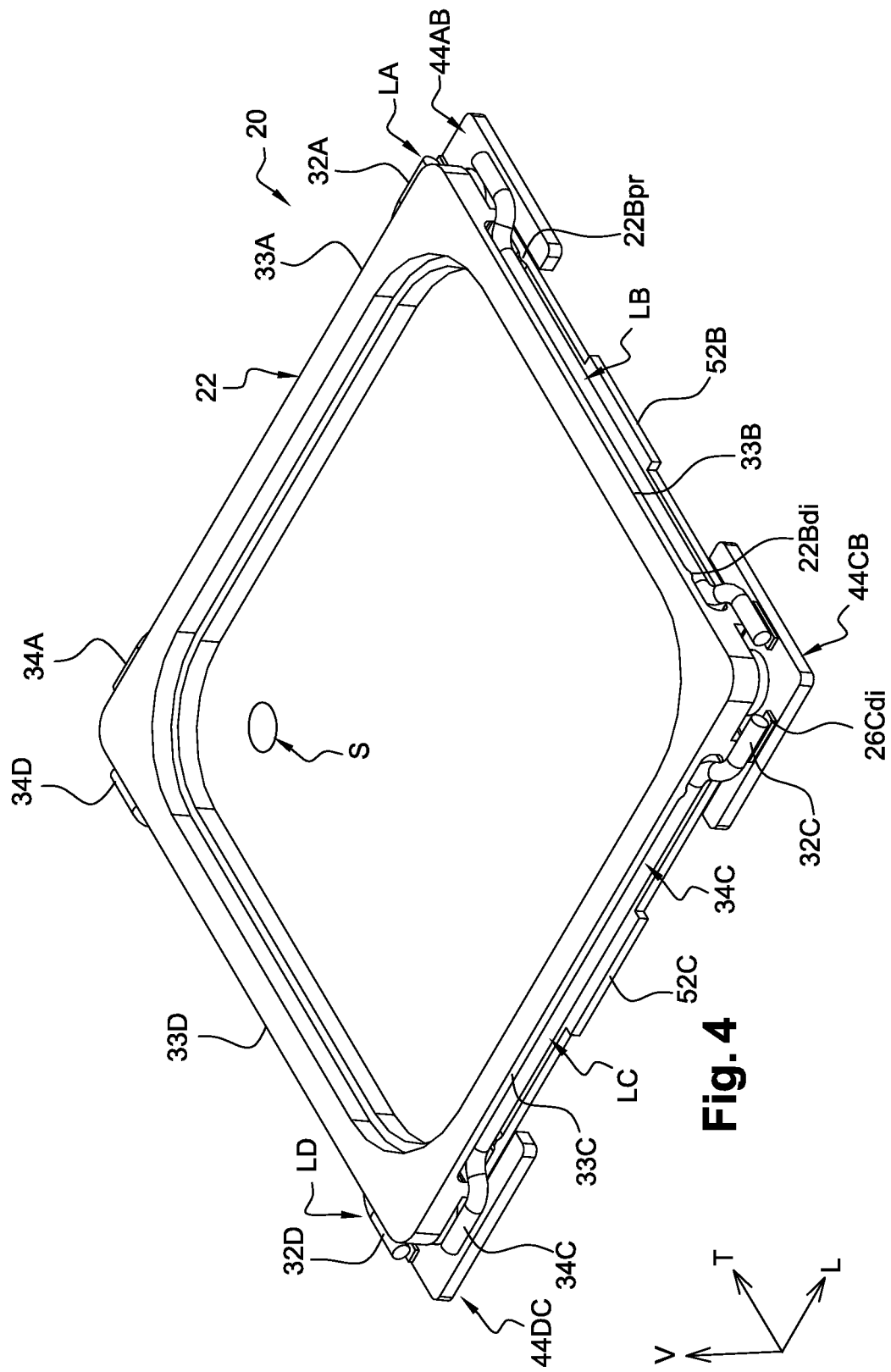
FIG. 4 depicts a larger-scale view of certain of the components of the device represented in FIG. 1.
Figure 5:
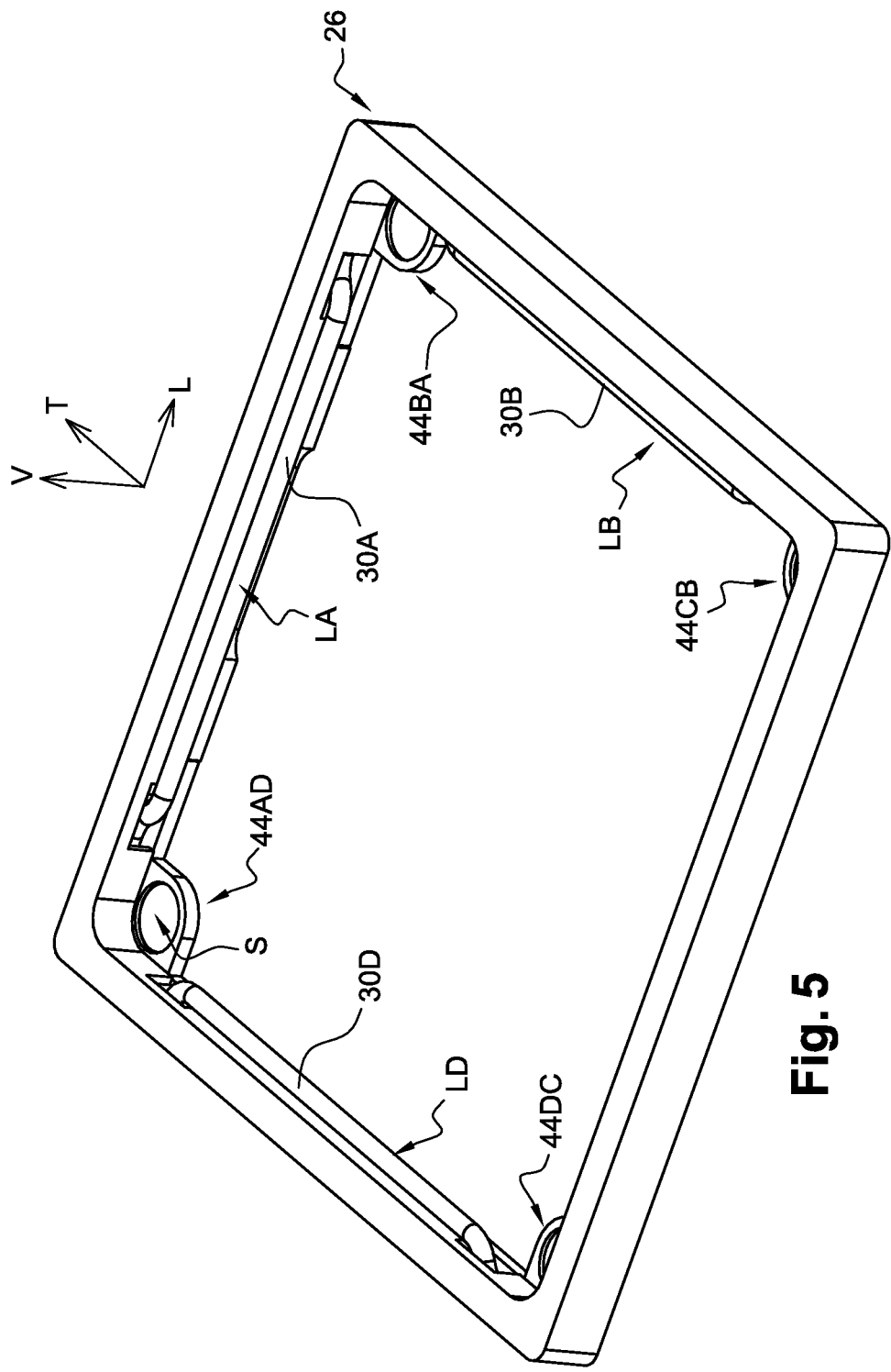
FIG. 5 depicts a view analogous to that of FIG. 4 illustrating certain components of the device of FIG. 1.
Figure 6:
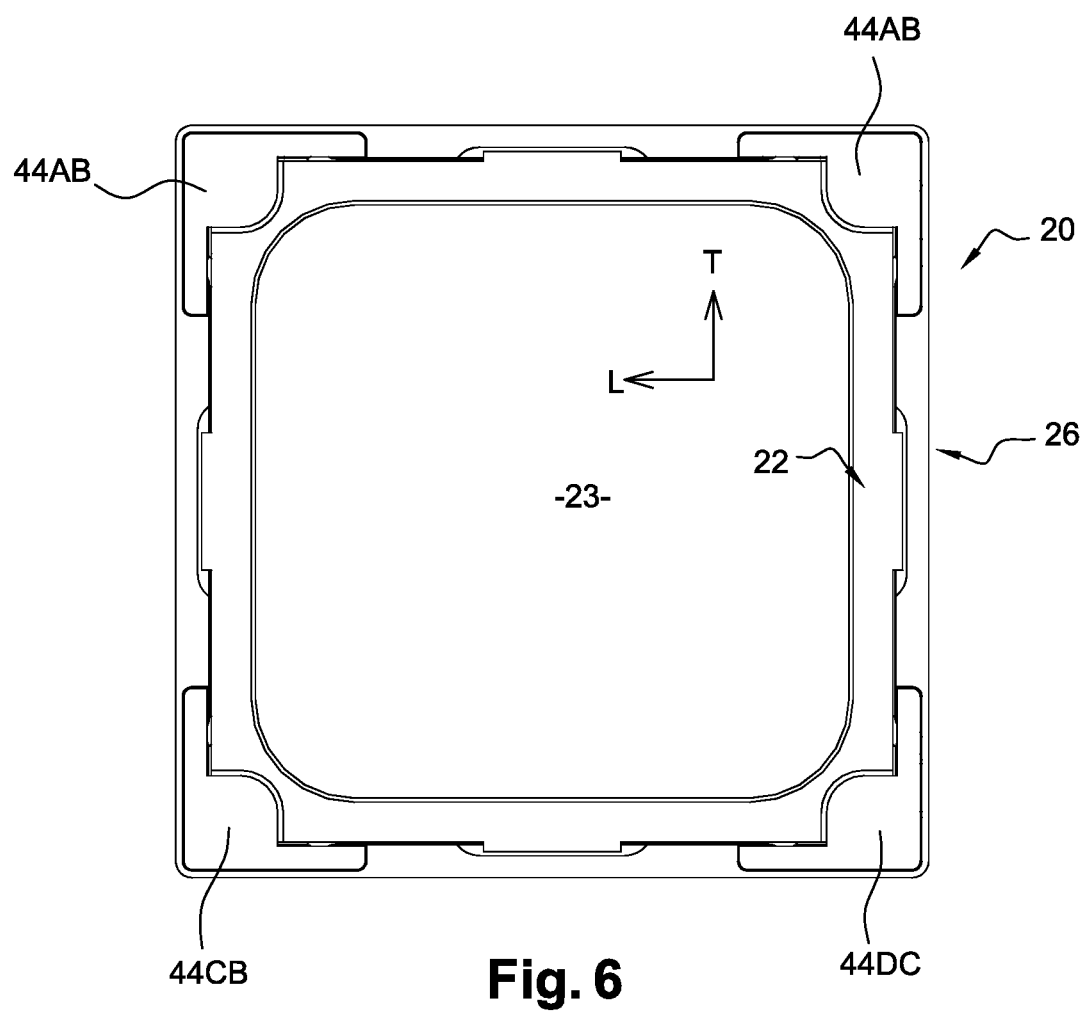
FIG. 6 depicts a view from below of the device of FIG. 1.

Reference will now be made to FIG. 15 in which the shaft LC has been represented by way of example. The latter will now be described in detail; the four shafts being of identical design. Each shaft may be, for example, an element made of metal wire. The shaft LC may be of rectilinear global orientation and it may comprise a rectilinear central part 30C which extends along a first geometric axis C1. The shaft LC may also comprise a distal end part 32C and a proximal end part 34C.

The two end parts 32C and 34C may be rectilinear and parallel to the central part 30C. Each of these end parts 32C and 34C may be joined to a corresponding end of the central part 30C by an "S"-shaped joining segment. The two end parts 32C and 34C may thus be offset laterally with respect to the central part 30C. The two end parts 32C and 34C may be aligned with one another, that is to say they are coaxial in relation to a second geometric axis C2 which is parallel to the first geometric axis C1.

The distal end part 32C may belong to the distal end segment CB of the shaft LC, while the proximal end part 34C may belong to the proximal end segment CD of the shaft LC. As will be explained subsequently, the shaft LC may be rotatably mounted with respect to the frame 22 of the upper panel 21 about the geometric axis C1, and it may be rotatably mounted with respect to the lower armature 26 about the geometric axis C2.

The frame 22 of the upper panel 21 may comprise, in each of its exterior vertical lateral faces 33A, 33B, 33C and 33D, a clearing in the form of an emergent horizontal groove, each of which is able to receive the central part 30A, 30B, 30C and 30D of the associated shaft. Each groove 34A, 34B, 34C and 34D may be delimited by two opposite horizontal faces, upper and lower, each of which may comprise, in the vicinity of one of its ends, a stud in relief or projecting constituting a bearing point for the opposite portion of the central part of the associated shaft.

Figure 18:
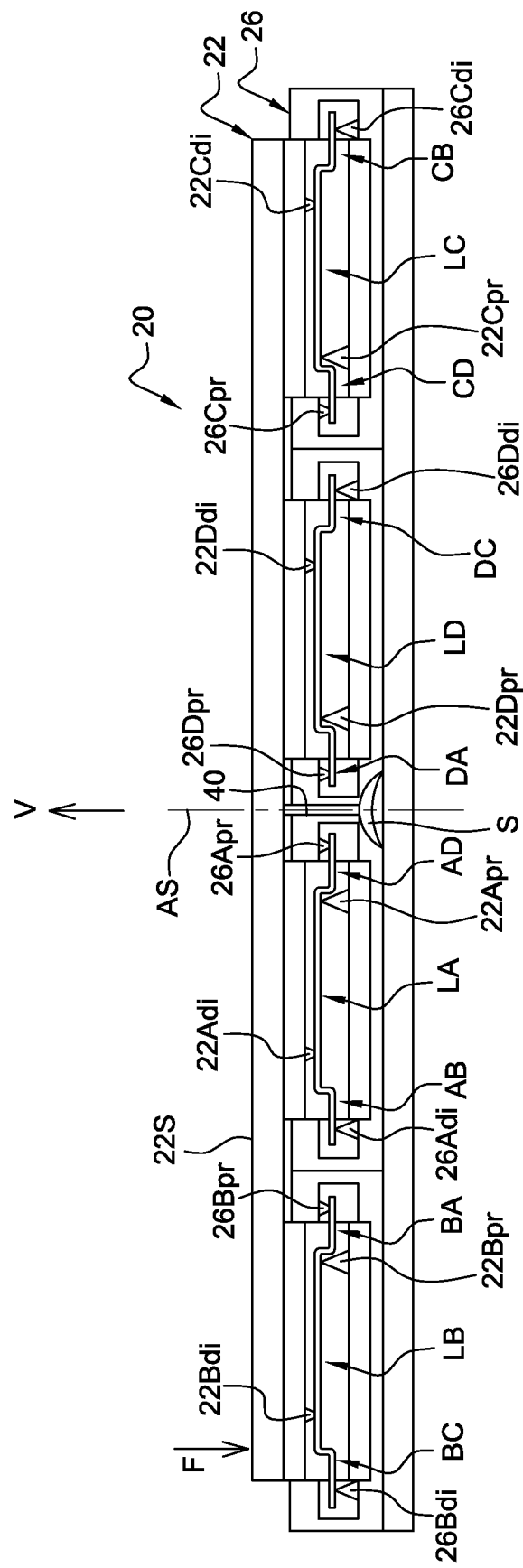
FIG. 18 depicts a developed schematic view of the device represented in FIG. 1 making it possible to explain the operation thereof.

Each groove or housing may thus comprise an "upper" contact point 22Bdi, 22Adi, 22Ddi, and 22Cdi at its distal end and a "lower" contact point 22Apr, 22Bpr, 22Cpr and 22Dpr at its proximal end, and with each of which the associated shaft cooperates via its central part. The arrangement and the position of these contact points belonging to the frame 22 are illustrated in detail in FIG. 18.

In its horizontal lower face 36, the frame 22 of the upper panel 21 may comprise, at each of its corners, a recess 38AB, 38BC, 38CD and 38DA. In the recess 38DA, the frame 22 may comprise a finger 40 for actuating the switching breaker S which extends vertically downwards along the axis AS of actuation of the switching breaker S. The lower free end of the finger 40 may cooperate with the cambered upper face of the dome constituting the switching breaker S.

In the same manner, the frame-shaped lower armature 26 may comprise, in each of its sides, or uprights, two recesses, each arranged in the vicinity of an end, each of which is able to receive the associated end part of a shaft. Thus, for example, the side "A" of the lower armature 26 may comprise two housings 38A, 40A, each of which receives the associated end part 32A, 34A of the shaft LA. Each housing 38A, 40A may thus take the form of a longitudinal groove and the interior vertical lateral face 42A, 42B, 42C and 42D of the frame may comprise two openings or windows allowing free passage of the "S"-shaped elbow joining, for each shaft, the associated end part with the central part. For example, the face 42A comprises two openings 41A and 39A.

To allow the assembly of the components and in particular the mounting of the end parts of the shafts in their respective housings, each housing 38A, 40A may be opened vertically downwards and is closed thereafter by a cover of complementary shape 44AB, 44CB, 44DC and 44DA in the shape of an L with two branches. The dome of the switching breaker S may be received in a complementary housing 46 formed in the upper face of the cover 44DA which, in the assembled position, is in line with the actuation finger 40 of the frame 22 of the upper panel 21.

So as to constitute "lower" contact points 26Bdi, 26Adi, 26Ddi, and 26Cdi for the opposite distal end parts of the shafts, the upper faces of the covers may comprise studs in relief or projecting, vertically upwards, with which the opposite portions of the distal end parts cooperate. These various studs are indicated in detail in the figures and in particular in FIG. 18. Thus, the lower armature may comprise four "distal" contact points.

In the same manner, the upper face of some of the housings may likewise comprise a stud in relief or projecting, vertically downwards, so as to constitute an "upper" contact point 26Apr, 26Bpr, 26Cpr and 26Dpr with which an opposite proximal portion of the central part of the associated shaft may cooperate. The upper contact points belonging to the lower armature are illustrated and referenced in detail in FIG. 18.

In this first exemplary embodiment, non-limitingly, for each shaft LA, LB, LC, LD, its two points of contact, distal and proximal, with the upper panel are arranged longitudinally between its two points of contact, distal and proximal, with the lower armature. Stated otherwise, the two points of a pair of contact points, proximal respectively distal, are offset longitudinally with respect to one another.

As may be seen in the figures, the upper panel may comprise four positioning and abutment claws 52A, 52B, 52C and 52D each of which is received in a corresponding notch 54A, 54B, 54C and 54D formed opposite in the lower armature 26. The four claws may define four abutments which determine the top rest position of the upper panel with respect to the lower armature.

In the assembled position of the components, each shaft may be mounted preferably without play between its various contact points arranged in the lower armature 26 and in the frame 22 of the upper panel 21.

In the detailed description which has just been given, the first exemplary embodiment of the control device exhibits a general symmetry of design with respect to the median vertical plane PVM, extending along a diagonal, and passing through the vertical axis AS of actuation of the switching breaker S. The operating principle of the first embodiment of the device will now be described, in particular with reference to FIGS. 16 to 18.

When a control loading F is applied to the upper face of the upper panel, whatever the geographical position of the point of application of this control loading on this surface, the articulated structure composed of the four shafts may transmit the motion and the loadings from one corner to another, up to the switching breaker S situated at one of the corners. The transmission may always take place in the same sense indicated by the arrows FB, FC, FA and FD, that is to say, for each shaft, from its distal end towards its proximal end. In this manner, any tilting of the upper panel is avoided, that is to say the upper panel remains almost perfectly horizontal or parallel to itself during actuation with a view to causing the triggering of the switching breaker.

Figure 16:
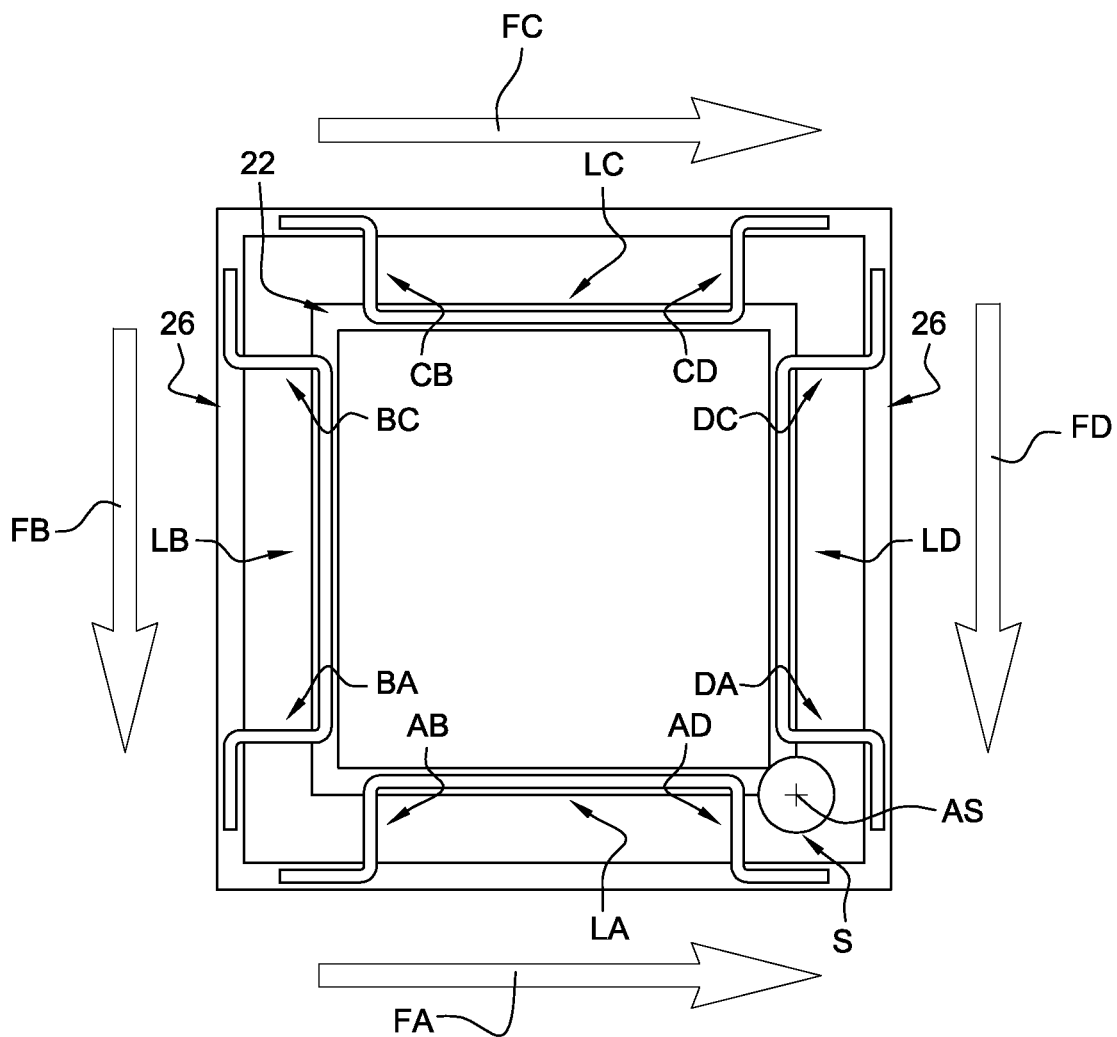
FIG. 16 depicts a schematic representation of the main components of the device of FIG. 1 with a view to explaining the operation thereof.

When the loading applied to the upper panel is relaxed, the loading may be applied in the reverse sense to that indicated by the arrows represented in particular in FIG. 16.

Figure 17:
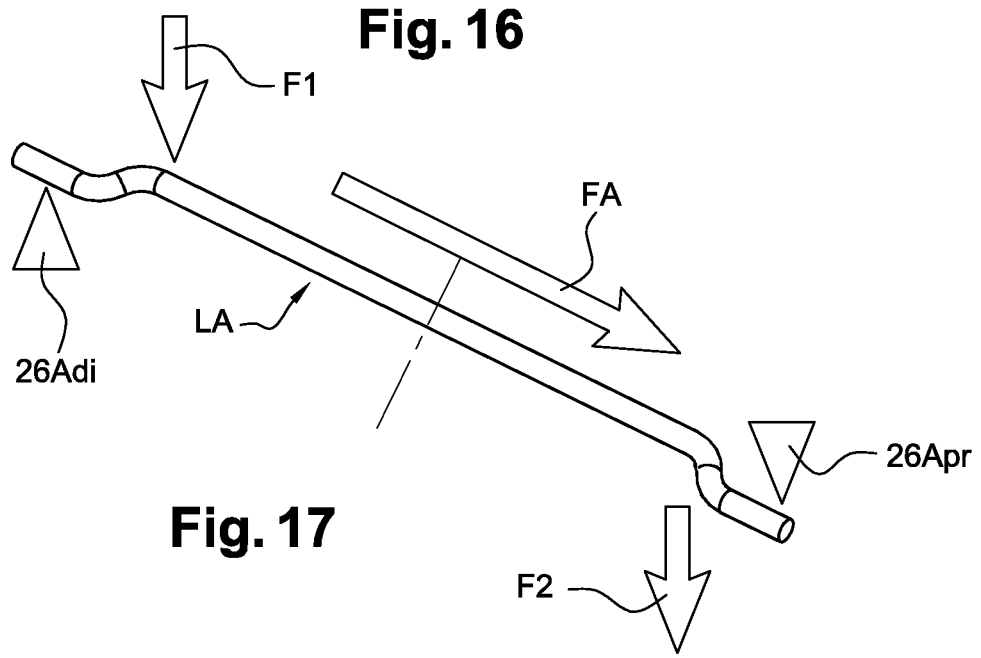
FIG. 17 depicts a diagram making it possible to illustrate the operation of a shaft of the device according to the invention.

Referring to FIG. 17, during actuation, that is to say when a loading F is applied to the upper panel (see FIG. 18), a force F1 may be applied by the upper panel to the lever LA while a reaction force is applied by the contact point 26Adi. The force may be transmitted along the arrow FA and a force F2 equal to the force F1 is applied by the other end (proximal) of the shaft LA to the other end of the upper panel along the side A with the associated reaction contact point 26Apr.

So as to guarantee that the transmission of the forces and the rotations of the levers, about their axes "1" and "2" may always occur in the same sense, the actuation axis AS of the switching breaker S may be placed substantially tangential to the contour of the actuation surface 23s accessible to the user.

In the embodiment which has just been described, the axis AS may be situated at the corner angle AD substantially tangential to the angle of the surface 23s. The arrangement according to the invention with its articulated structure may guarantee not only that the upper panel remains horizontal and parallel to itself, but it may also afford equality of sensation of actuation loading and of tactile sensation during the triggering of the switching breaker, whatever the position of the actuation point on the upper actuation surface.

Figure 19:
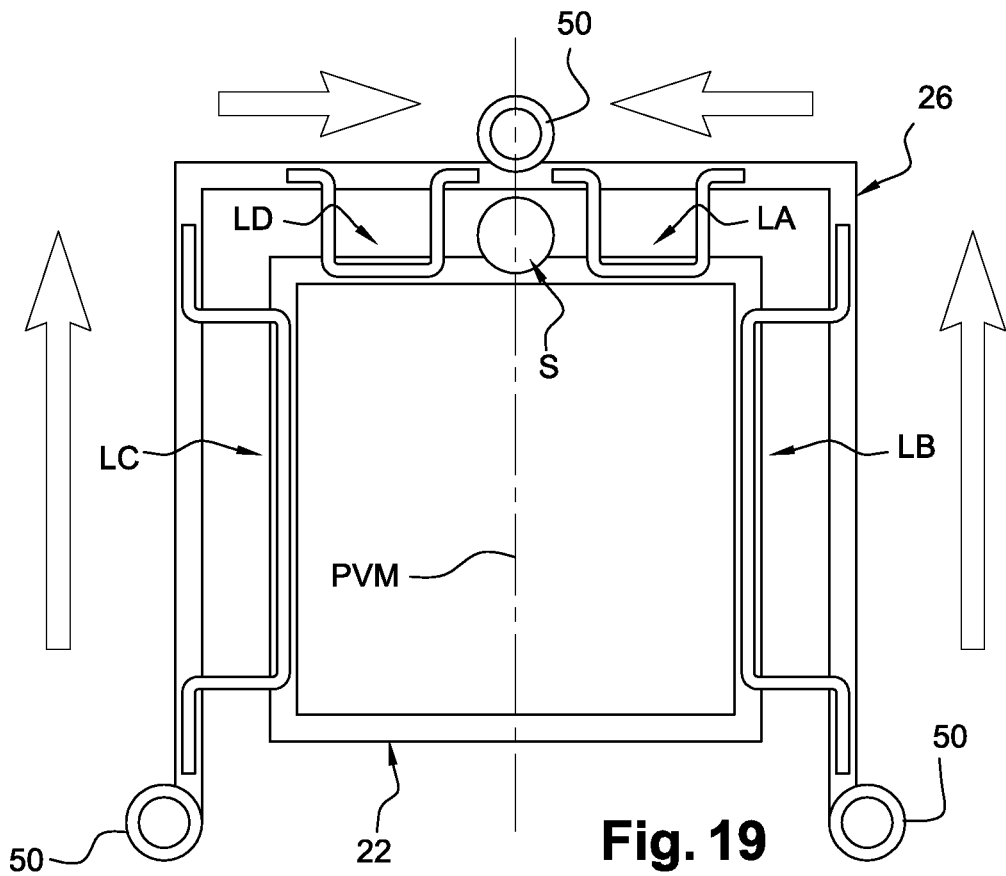
FIGS. 19 and 20 depict schematic views illustrating the design principle of two variants of the principle of the invention implemented in the device illustrated in FIGS. 1 and 16 respectively.

Represented in FIG. 19 is another embodiment in which the four shafts are arranged only along three consecutive sides of the upper control panel, with two shafts LA and LD arranged along one and the same side and the axis of the switching breaker S arranged along the contour of this side and between the two adjacent proximal ends of these two shafts LA and LD. This arrangement may preserve the general symmetry of design with respect to a median vertical plane PVM passing through the axis AS and entirely clears a side of the device making it possible to simplify the "U"-frame shaped lower armature by "removing" one of the sides of this armature.

The three fixing points 50 for the lower armature 26 may be arranged as illustrated in FIG. 19 with a fixing point close to the switching breaker in order to limit the possible deformations of the lower armature 26 and of the control device during actuation. It may indeed be desirable that one of the fixing points be always situated in proximity to the switching breaker.

Figure 20:
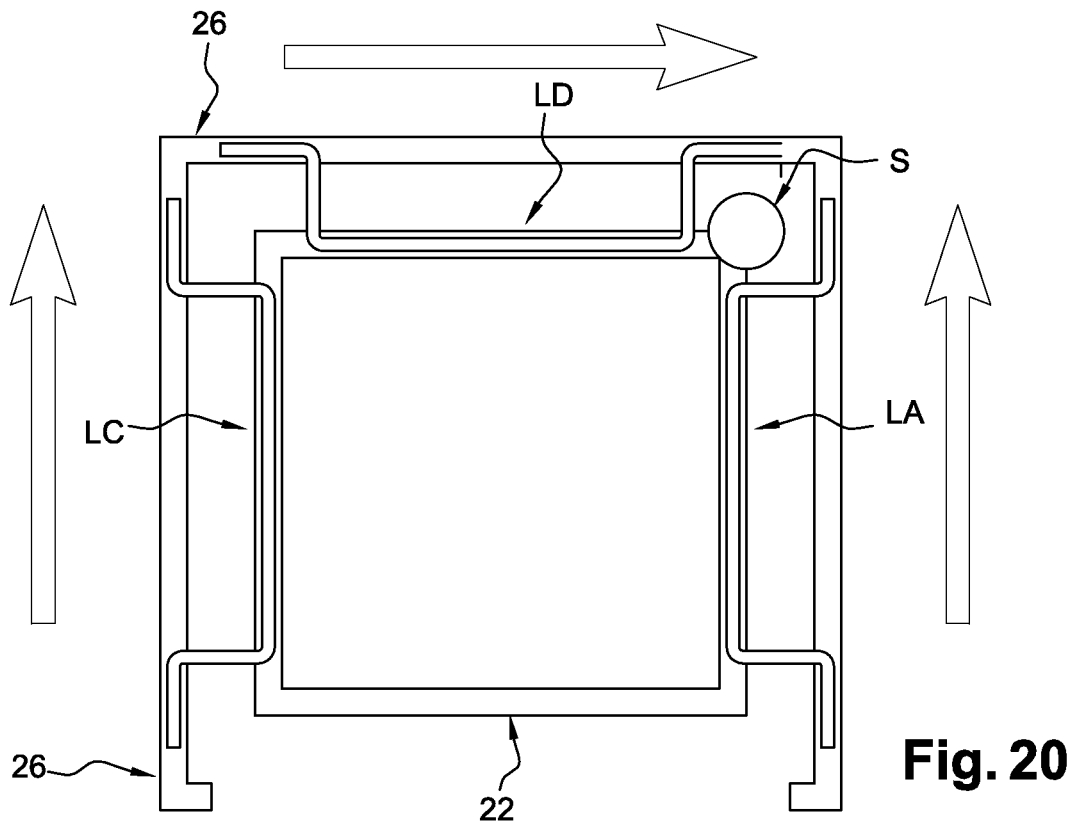

In the previous embodiment with four shafts, each of which is arranged along one of the four sides, the four fixing points may be advantageously arranged at each of the corners of the device, and therefore with a fixing point likewise adjacent to the switching breaker. In the variant embodiment represented in FIG. 20, the control device may comprise only three shafts LA, LC and LD, here also with a "U"-frame shaped lower armature with three consecutive sides and the switching breaker S arranged at the corner AD. The operation of this device illustrated in FIG. 20 may be analogous to that of the devices illustrated in FIGS. 16 and 19, but it no longer exhibits symmetry of design.

In addition to the advantages relating to the mastery of the behavior of the upper panel 21 with respect to the lower armature 26 during actuation, the various designs according to the invention with peripheral shafts of the articulated structure may make it possible to almost entirely clear the surface on the printed circuit board inside the lower armature for the arrangement of various components and/or for example of one or more light sources.

The dome of the switching breaker has been represented as bearing downwards on an opposite portion of the lower armature 26 and with an actuation finger 40 belonging to the upper panel 21. Mechanical reversal, without departing from the scope of the invention, is of course possible by arranging the dome "the other way up" which may then bear against an opposite portion of the lower face of the upper panel 21 and with the actuation finger belonging to the lower armature 26. As a function of the position and orientation of the dome belonging to the switching breaker, linkup of the electrical contact may track to establish the switching path is performed, with the printed circuit board, either directly by way of the lower armature, or by way of a flat cable joined to the lower face of the upper panel.

In the embodiments which have just been mentioned, the elastically deformable dome with abrupt change of state of the switching breaker may also function as elastic abutment for the upper panel and therefore as means of elastic restoring of the upper panel to its top rest position. Of course, without departing from the scope of the invention, it is possible to arrange, for example in the form of springs, the means of elastic restoring of the upper panel in the form of components independent of the components of the switching breaker, it then being possible for the latter to consist of a simple conducting wafer coming, at the end of the vertical travel of the upper panel, into contact with corresponding conducting tracks arranged opposite in the lower armature.

The second embodiment, such as is represented from FIG. 21 will now be described in greater detail. This second embodiment corresponds to the principle of implementation of the invention illustrated schematically in FIG. 19 in which the articulated structure still comprises four shafts with the switching breaker S interposed between the two neighboring shafts LA and LD.

In this embodiment, which exhibits symmetry of design with respect to the plane PVM, the two shafts LA and LD may be aligned and arranged along one and the same long side of the device corresponding to its long length, while the other two shafts LB and LC are each arranged along one of the short sides corresponding to the width of the device 20. Such an arrangement may make it possible, as was indicated previously, to entirely clear the other long side of the device, opposite from the shafts LA and LD, for example to rig up components under the device in the electronic apparatus equipped with this device.

Figure 26:
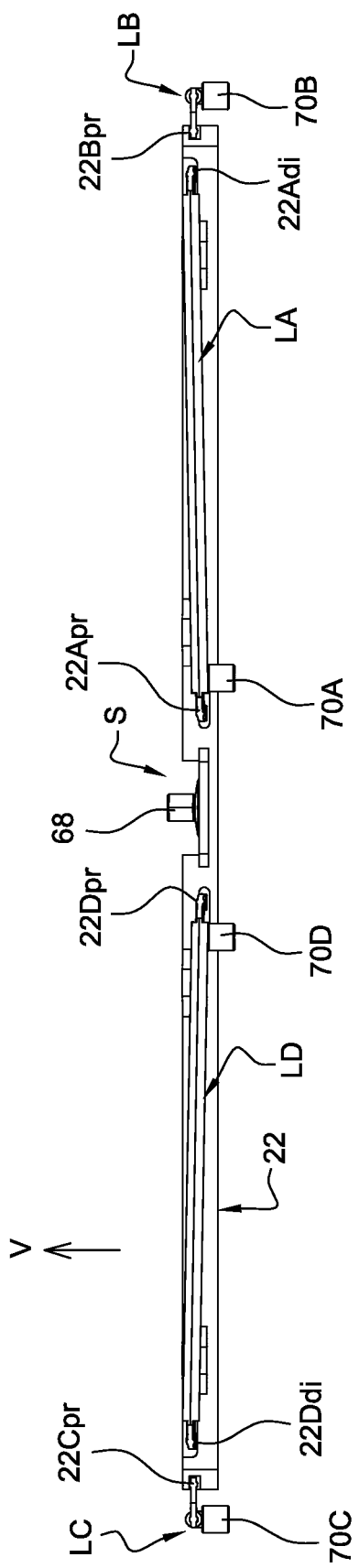
FIG. 26 depicts a side view of the device illustrated in FIGS. 21 and 22.
Figure 27:
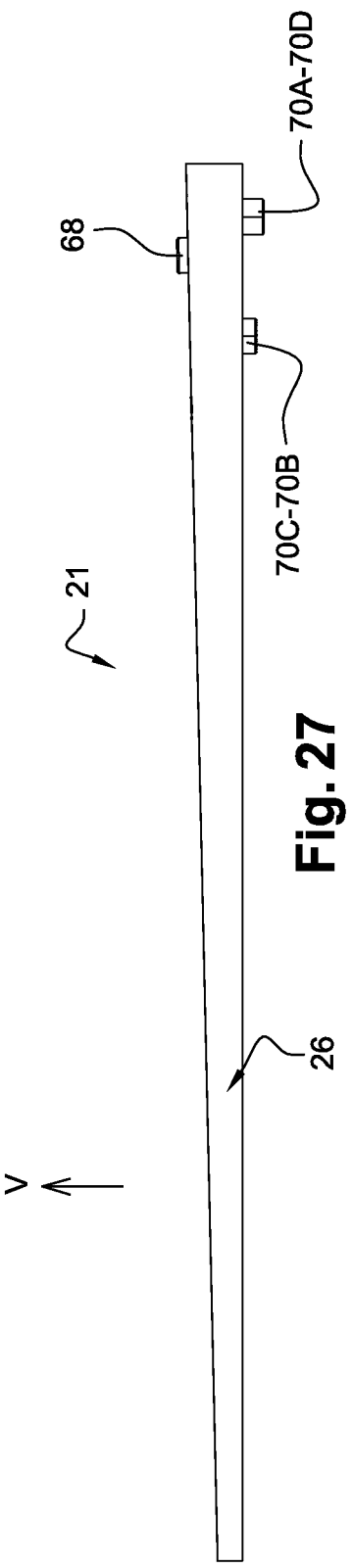
FIG. 27 depicts another side view of the device illustrated in FIGS. 21 and 22.
Figure 28:
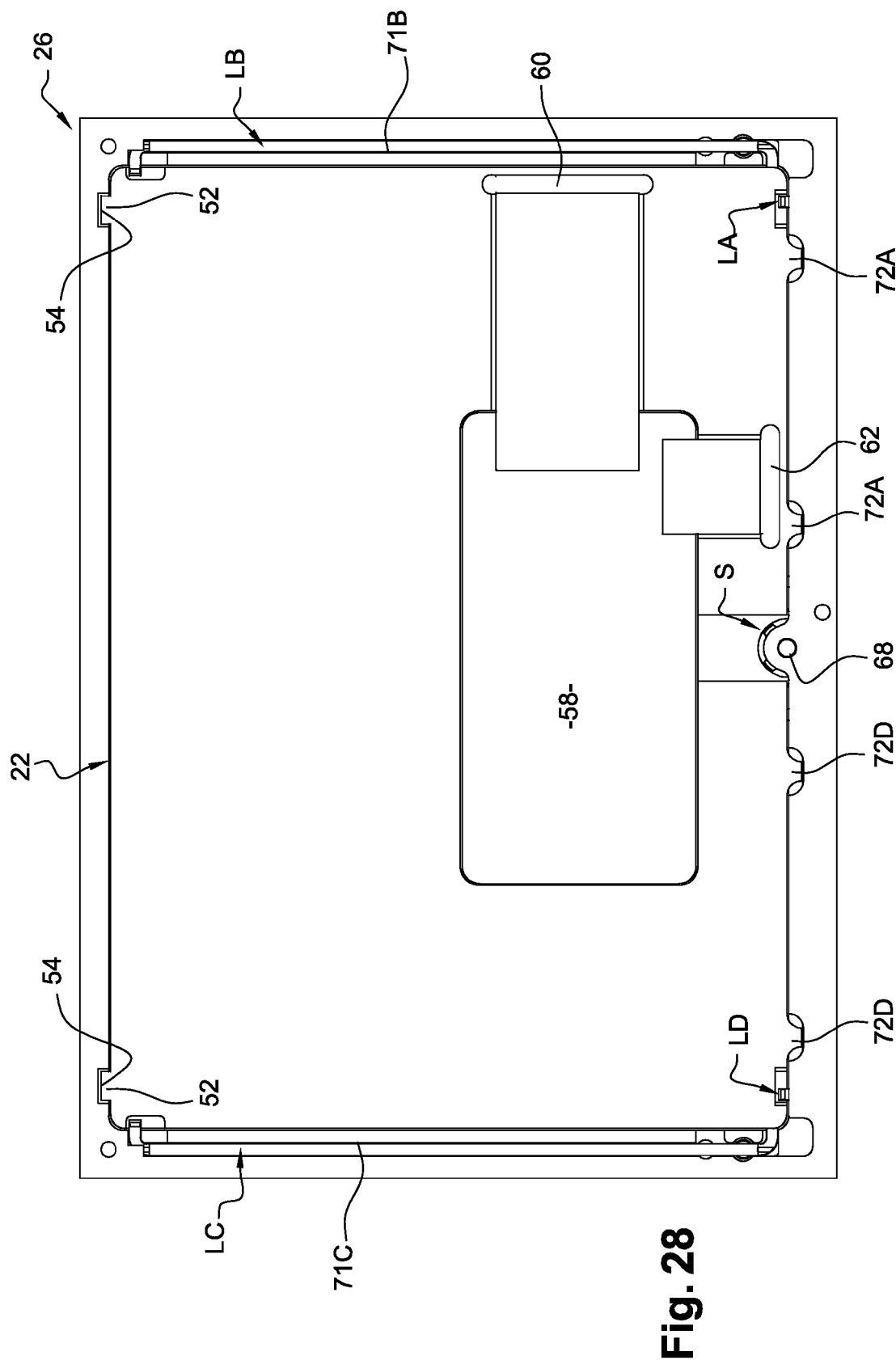
FIG. 28 depicts a view from below of the components illustrated in FIGS. 21 and 22 shown in the assembled position.
Figure 29:
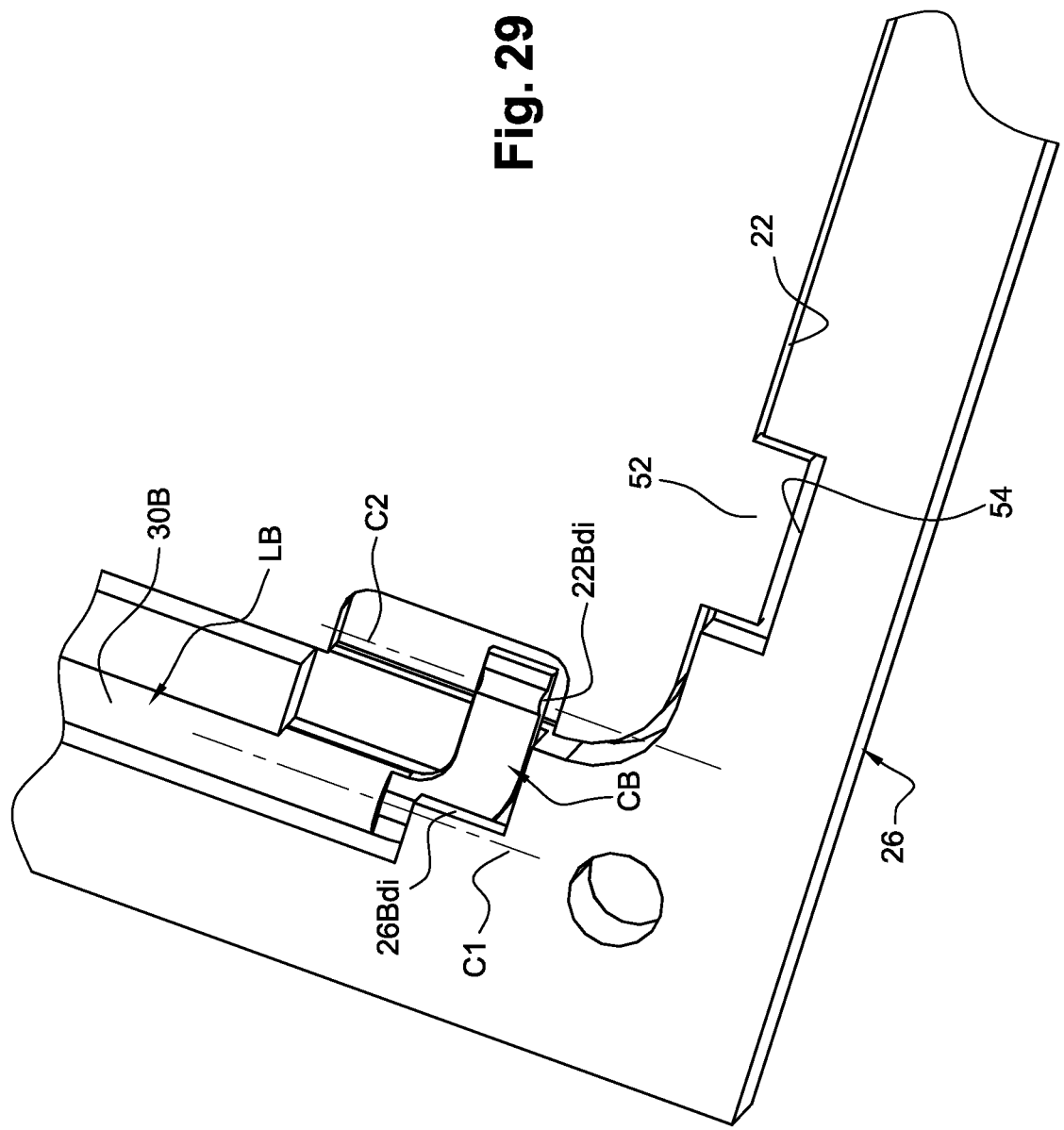
Figure 30:
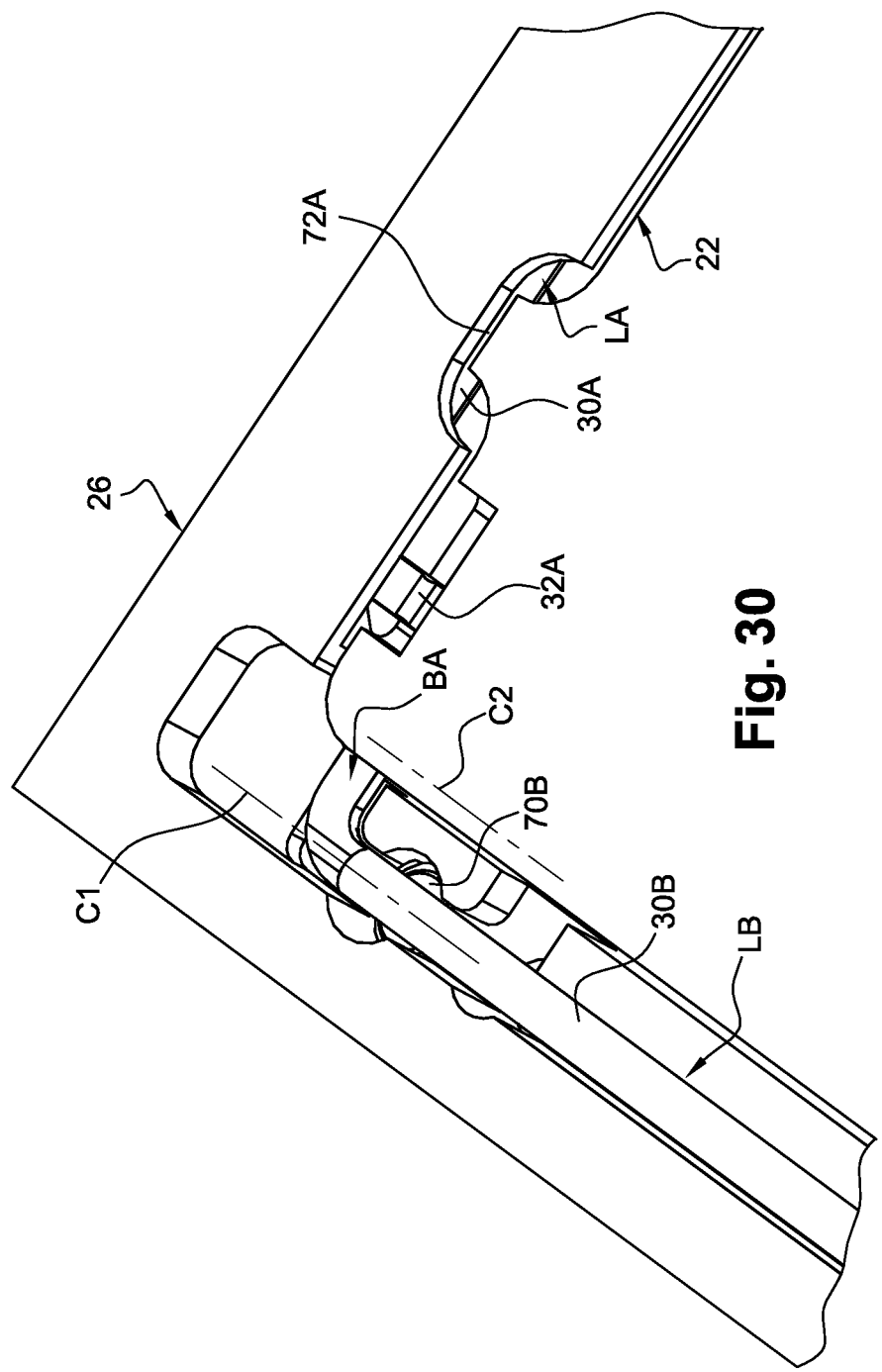

This arrangement, as may be seen be seen in FIG. 26, may also make it possible to produce a device "thinned down" in proximity to the long side devoid of shafts in order to facilitate for example its integration into an electronic device such as a laptop computer by arranging the "thin" longitudinal edge (with no shaft) in proximity to the free edge of the laptop computer situated on its user's side when the device according to the invention is used as a "Touchpad" of a laptop computer, the current design of these laptop computers being such that this edge of the apparatus adjacent to the user is the thinnest or slenderest of the apparatus.

As may be seen in FIGS. 21 to 26, the dome of the switching breaker S may bear upwards against an opposite portion 64 of the upper panel which can comprise one or more electrical contact tracks arranged opposite the dome. Opposite, the armature 26 may comprise, in a projecting part 66, an adjusting screw 68 making it possible, after assembly, to adjust the plays and the gauging of the switching breaker S by acting on the dome.

In the same manner, after assembly and in order to take up all of the assembly plays, each shaft may be associated with at least one adjusting screw 70A, 70B, 70C and 70D which is associated in an adjustable manner, in the vertical direction V, with the armature 26. Each adjusting screw 70A, 70B, 70C and 70D may comprise a bearing surface or contact surface 72A, 72B, 72C and 72D which cooperates with an opposite portion of the shaft LA, LB, LC, LD associated with this adjusting screw.

After assembly, each adjusting screw may be adjusted, in the vertical direction V, with respect to the armature 26 so as to take up the plays and to very slightly load the associated shaft, and then the adjusting screw is immobilized with respect to the armature 26 while maintaining the preload applied to the shaft.

Without departing from the scope of the invention, each adjusting screw may be replaced with any analogous member ensuring, for each shaft, the same function of adjustment and preload after assembly.

Each shaft LC or LB may also be held without play in the horizontal direction orthogonal to its main longitudinal direction, with respect to the armature 26, by being received in a complementary groove 71C, 71B of the armature 26. Each shaft LA or LD may also be held without play in the horizontal direction orthogonal to its main longitudinal direction, with respect to the armature 26, by being received in a complementary groove 71A, 71D of the armature 26 in which it is held by complementary studs 72A, 72D of the frame 22.

Figure 21:
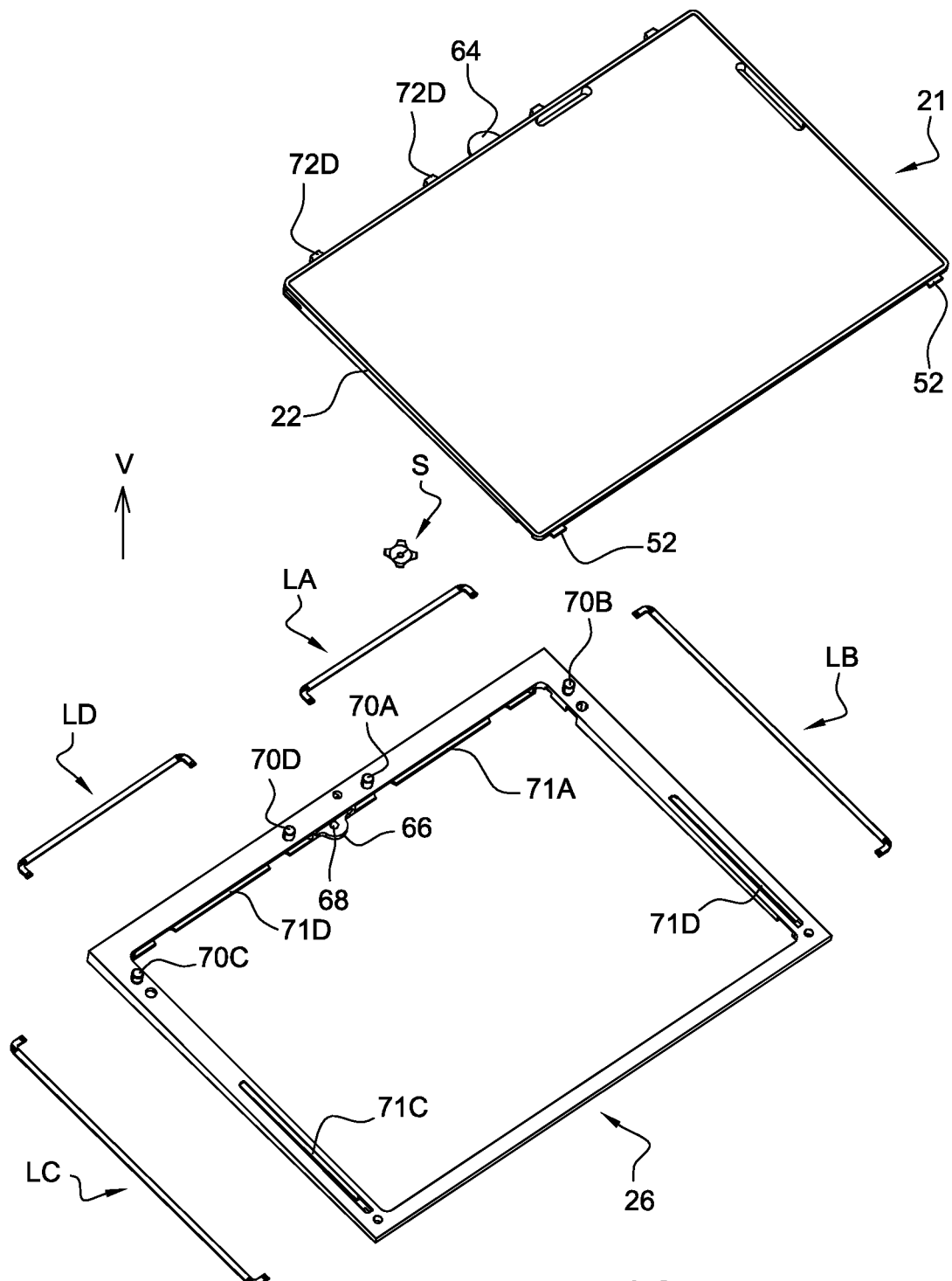
FIG. 21 depicts a view analogous to that of FIG. 2 of a second exemplary embodiment of a control device according to the invention corresponding to the variant shown diagrammatically in FIG. 19.
Figure 22:
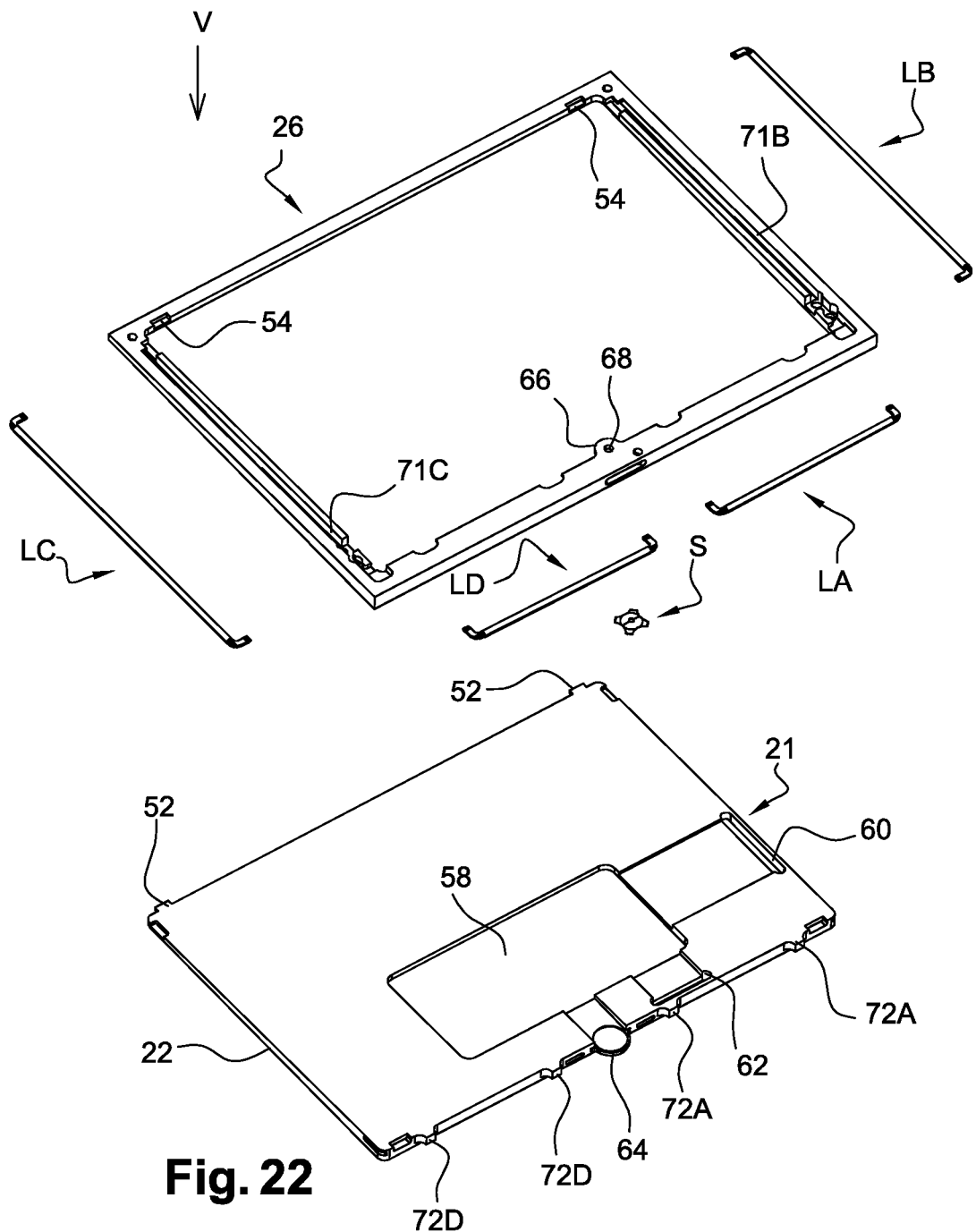
FIG. 22 depicts a view analogous to that of FIG. 21 according to another angle of view.

As may be seen in FIGS. 21 and 22, the upper panel may comprise two positioning and abutment claws 52 each of which is received in a corresponding notch 54 formed opposite in the lower armature 26. The two claws may be supplemented with the parts 64 and 66 with interposition of the dome so as to define three abutments which determine the top rest position of the upper panel with respect to the lower armature.

The lower face of the upper panel 22 may comprise several adjacent recesses 56, 58 envisaged for the arrangement of the electronic control circuits and flexible linking connectors of the upper panel and in particular with the components of the active central blocks of the upper panel when the latter is a touchpad and/or a touchscreen, the upper panel comprising two lateral slots 60, 62 for the passage of the flexible electrical linking cables.

Figure 23:
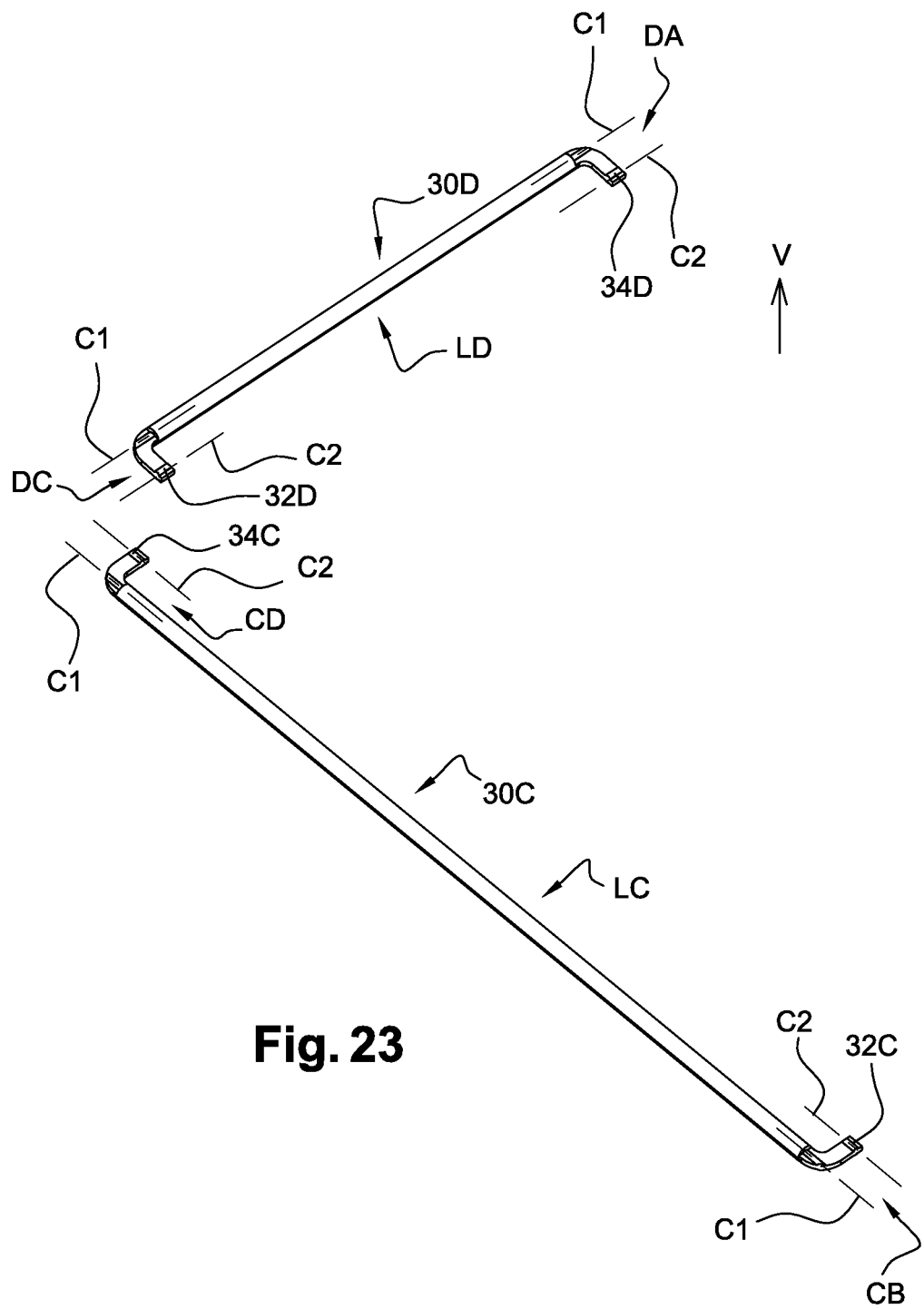
FIG. 23 depicts a view analogous to that of FIG. 15 which illustrates two consecutive shafts of the device represented in FIG. 21.
Figure 24:
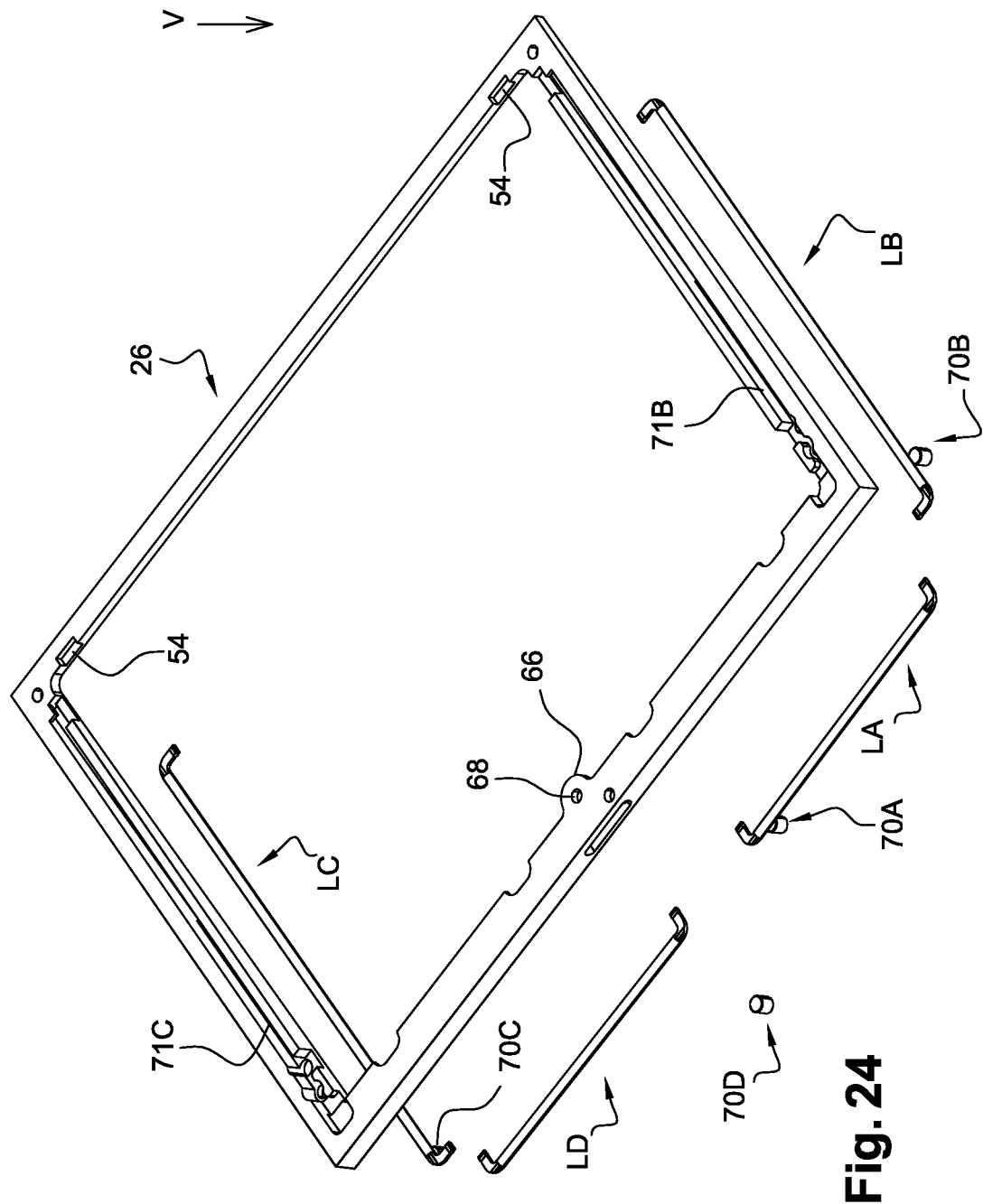
FIG. 24 depicts an exploded perspective view of certain of the components of the device illustrated in FIGS. 21 and 22.
Figure 25:
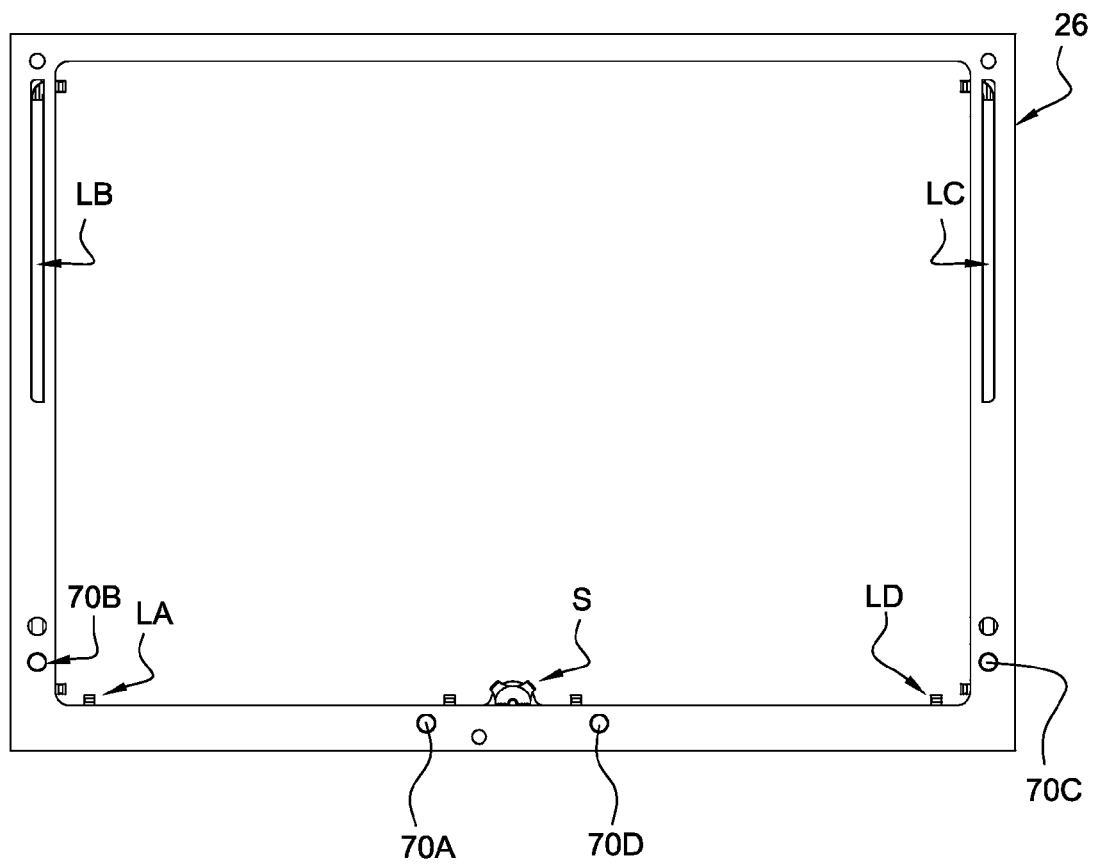
FIG. 25 depicts a view from below of certain of the components of the device illustrated in FIGS. 21 and 22.

Reference will now be made to FIG. 23 in which the shaft LC and the shaft LD of the second exemplary embodiment have been represented by way of example. The four shafts being pairwise of identical design, LC and LD will now be described in detail.

The shaft LC, LD may be of rectilinear global orientation and it comprises a rectilinear central part 30C, 30D which extends along a first geometric axis C1. The shaft LC, LD may also comprise a distal end part 32C, 32D and a proximal end part 34C, 34D. Each of these end parts 32C, 32D and 34C, 34D may be joined to a corresponding end of the central part 30C, 30D by a joining segment which is here perpendicular to the axis C1. The two end parts 32C, 32D and 34C, 34D may be rectilinear and parallel to the central part 30C, 30D with respect to which they are thus laterally offset. The two end parts 32C, 32D and 34C, 34D may be aligned with one another, that is to say they are coaxial in relation to a second geometric axis C2 which is parallel to the first geometric axis C1. The distal end part 32C, 32D may belong to the distal end segment CB, CD of the shaft LC, LD, while the proximal end part 34C, 34D may belong to the proximal end segment CD, DA of the shaft LC, LD.

As will be explained subsequently, the shaft LC, LD may be rotatably mounted with respect to the frame 22 of the upper panel 21 about the geometric axis C2 and it may be rotatably mounted with respect to the lower armature 26 about the geometric axis C1. In this second exemplary embodiment, non-limitingly, for each shaft LA, LB, LC, LD, the two points of a pair of contact points, proximal respectively distal, may be substantially aligned longitudinally with respect to one another and are thus aligned in relation to a straight line orthogonal to the axes C1 and C2. Thus, in operation, each shaft may behave essentially as an "articulation" piece undergoing almost no flexions.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A device for the control of an electronic apparatus, the device comprising:
 a horizontal upper panel comprising an upper actuation face that is delimited by a contour and upon which a user can exert at least one control action by applying to it a downward oriented pressure loading;
 a lower support armature to which the upper panel is movably mounted and configured to move in a vertical motion between a top rest position, to which the panel is elastically restored, and an active bottom position;
 a switching breaker configured to be triggered directly by the upper panel when the upper panel is in the active bottom position; and
 an articulated structure that is interposed vertically between the upper panel and the lower armature to hold the upper panel parallel to a horizontal plane during its downward vertical motion with respect to the armature;
 wherein:
  the vertical axis of actuation of the switching breaker is arranged at a periphery of a contour of the upper panel, and
  the articulated structure comprises a plurality of consecutive shafts, wherein each of the plurality of consecutive shafts:
   extends in a rectilinear direction and is arranged along an associated edge of the contour of the upper actuation face;
   comprises a first distal end segment with respect to the breaker and is configured to bear vertically downwards against a distal contact point of the lower support armature and bear vertically upwards against a distal contact point of the upper panel; and
   comprises a second proximal end segment with respect to the breaker and is configured to bear vertically upwards against a proximal contact point of the lower support armature and bear vertically downwards against a proximal contact point of the upper panel;
  wherein, for each shaft:
   its associated distal contact point with the upper panel and its associated proximal contact point with the upper panel are positioned longitudinally according to a first longitudinal geometric axis, and
   its associated distal contact point with the lower support armature and its associated proximal contact point with the lower support armature are positioned longitudinally according to a second geometric axis which is parallel to the first geometric axis.

2. The device according to claim 1, wherein the vertical axis of actuation of the switching breaker is positioned between two proximal end segments of two consecutively positioned shafts.

3. The device according to claim 1, wherein:
the switching breaker is interposed vertically between the upper panel and the lower support armature; and
the switching breaker is configured to produce a control signal when it is subjected to a pressure loading greater than a predetermined threshold value, and when the value of the pressure loading is less than the said threshold value, the switching breaker constitutes an abutment of the upper panel in its upper rest position to which it is restored elastically by the switching breaker.

4. The device according to claim 1, wherein each of the plurality of consecutive shafts is rotatably mounted with respect to the upper panel about a first geometric axis parallel to the rectilinear direction along which it extends between its distal and proximal end segments, and wherein each of the plurality of consecutive shafts is rotatably mounted with respect to the lower support armature about a second geometric axis parallel to the rectilinear direction along which it extends between its two distal end segments.

5. The device according to claim 4, wherein each of the plurality of consecutive shafts comprises a rectilinear central part, a rectilinear distal end part parallel to the rectilinear central part and offset laterally with respect to the rectilinear central part, and a proximal end part that is aligned longitudinally with the distal end part, in that the said two contact points belonging to the upper panel cooperate with opposite zones of the said central part, and in that each contact point belonging to the lower support armature cooperates with an opposite zone of the associated end parts.

6. The device according to claim 1, wherein the upper actuation face is delimited by a rectangular polygonal contour, and wherein at least two consecutive shafts are arranged along at least two consecutive sides of the polygonal contour.

7. The device according to claim 6, wherein the device comprises symmetry of design with respect to a vertical plane of symmetry passing through the vertical axis of actuation of the switching breaker.

8. The device according to claim 1, wherein each of the plurality of consecutive shafts is associated with at least one adjusting member, the at least one adjusting member being adjustably associated in a vertical direction with the lower armature to take up assembly play and apply a preload to an associated shaft.

* * * * *